United States Patent

Collins

[15] 3,651,315

[45] Mar. 21, 1972

[54] DIGITAL PRODUCTS INSPECTION SYSTEM

[72] Inventor: Arthur A. Collins, Dallas, Tex.

[73] Assignee: Collins Radio Company, Cedar Rapids, Iowa

[22] Filed: May 14, 1970

[21] Appl. No.: 37,320

Related U.S. Application Data

[63] Continuation-in-part of Ser. No. 33,018, Apr. 29, 1970, abandoned.

[52] U.S. Cl. ............235/151.31, 324/73 R, 324/73 AT, 324/73 PC
[51] Int. Cl. ....................G01r 31/28, G01r 17/02
[58] Field of Search............235/151.31; 324/73 R, 73 AT, 324/73 PC

[56] References Cited

UNITED STATES PATENTS

| | | | |
|---|---|---|---|
| 2,996,666 | 8/1961 | Baker | 235/151.31 X |
| 3,082,374 | 3/1963 | Buuck | 235/151.31 X |
| 3,246,240 | 4/1966 | Arnold et al. | 324/173 |
| 3,471,779 | 10/1969 | Ley | 235/151.31 X |

Primary Examiner—Malcolm A. Morrison
Assistant Examiner—R. Stephen Dildine, Jr.
Attorney—Bruce C. Lutz and Robert J. Crawford

[57] ABSTRACT

A Digital Product Inspection System using a digital pseudo-random generator in combination with a charactertistic of the product being inspected to produce a unique set of data combinations which when compared with previously taken data from the test of a "known good unit" will provide an output indicating whether or not the characteristic of the unit under test is within acceptable limits.

31 Claims, 17 Drawing Figures

INVENTOR.
ARTHUR A. COLLINS
BY Bruce C Lutz
ATTORNEY

INVENTOR.
ARTHUR A. COLLINS
BY Bruce C Lutz
ATTORNEY

INVENTOR.
ARTHUR A. COLLINS
BY Bruce C. Lutz
ATTORNEY

INVENTOR.
ARTHUR A. COLLINS
BY Bruce C. Lutz
ATTORNEY

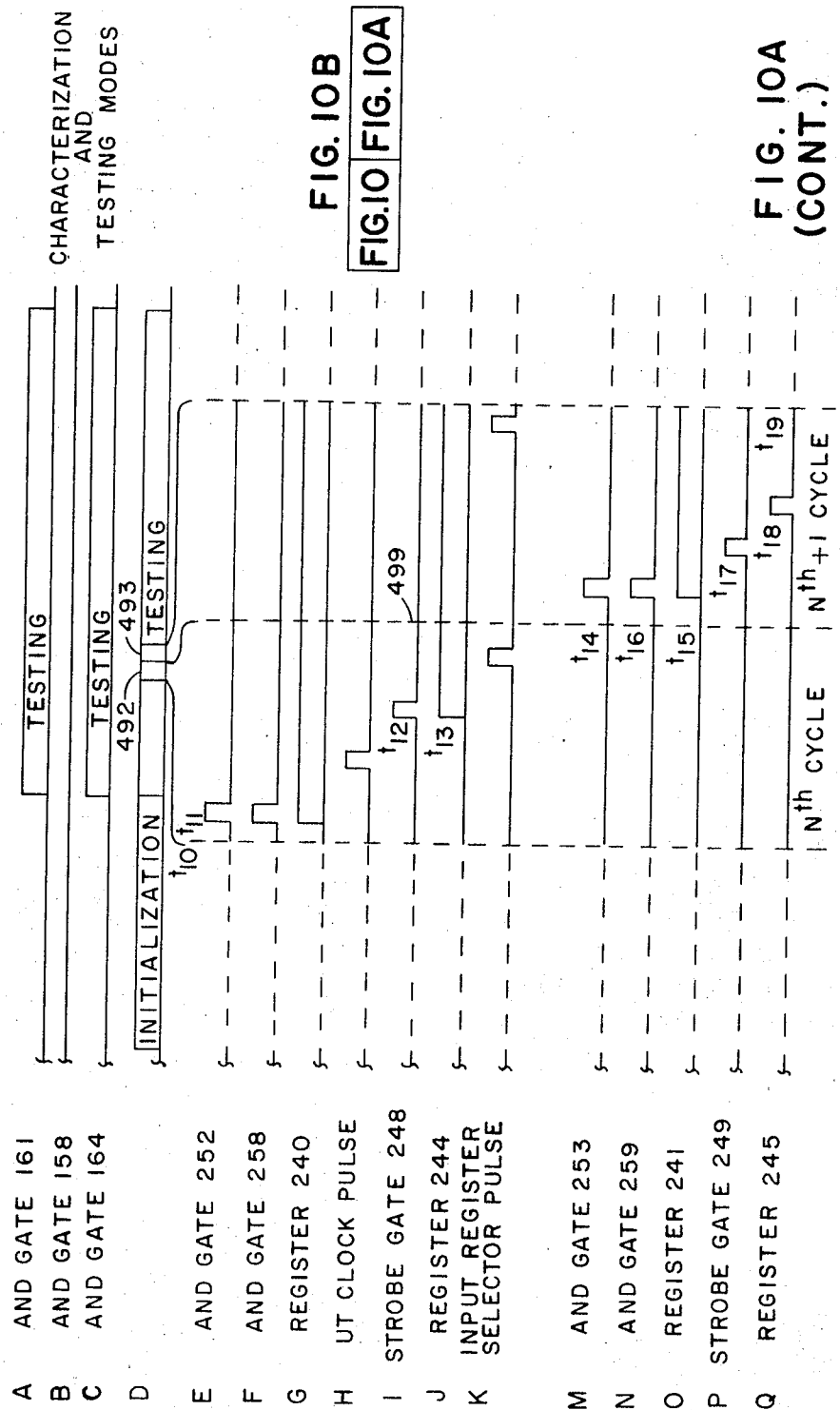

DIGITAL PRODUCTS INSPECTION SYSTEM

The present application is a continuation-in-part of a previously filed copending application by the present inventor and assigned to the same assignee as the present application. The copending application was filed on Apr. 29, 1970 with Ser. No. 33,018 and titled "Digital Products Inspection System," and now abandoned.

This invention relates generally to means for digitally testing various types of electronics products and more specifically it relates to a means and a method of digitally testing electronic products by means of a very large number of pseudo-random data words being circulated therethrough at a high rate of speed and being checked periodically for coincidence against a known truth table of data words.

INTRODUCTION

One of the major problems involved in the manufacture of electronic components, circuits, equipments, and systems is the testing thereof. Such testing must be made on substantially every electronic product, including for example, integrated circuits, MOS circuits, circuits comprised of discrete components as well as the discrete components themselves, equipments such as radios, systems comprised of various black boxes which cooperate with each other, and even data processor systems made up of a plurality of data processors and peripheral equipment. One means by which such testing has been accomplished in the prior art is by supplying to the electronic device, whether it be a component or a data processor, a series of pre-programmed data words with the responding output data words from said electronic device then being compared with a known good series of such responsive data words.

Because of the very large number of different electronic products manufactured by many companies, a great deal of engineering time is required to prepare the necessary testing programs. The number, length and frequency of the data words supplied to any given electronic unit under test (UUT) is determined by the nature of the unit under test. For example, it is apparent that a much more elaborate testing program must be employed in testing an electronic data processor than would be required to test simple AND gate logic circuits.

Once the test program for a given electronic device has been determined by an engineer, such testing program is then applied to a known good electronic device and the results thereof recorded in some suitable storage means, such as a magnetic tape. Subsequently the same test program is supplied the electronic devices to be tested (of the same type) and the results thereof compared with the results obtained from the known good unit. Often the test data words are supplied both to the known good unit and to the subsequent units under test from a data processor.

Supplying words to a unit under test directly from a data processor involves several problems, however. One of these problems is the fact that the speed with which the data word can be supplied to the unit under test is determined by the rate at which the data processor can deliver words, i.e., the access time to the bulk storage in the data processor system in which the data words are stored. It is possible to utilize a sophisticated, high-speed data processor which will deliver the words at a fast enough rate to accomplish the desired results. However, such an expedient would usually involve the use of an expensive data processor over extensive periods of time, since each data word supplied to the unit under test would be supplied from the data processor. A second problem arising when the processor supplies all of the data test words is that the test words must be originally programmed by an engineer, supplied to the data processor, and then subsequently supplied to the unit under test. Because an engineer's time is involved in initially programming the data test words to be supplied to the unit under test, the number of words supplied to the test unit are usually somewhat limited, thus limiting the scope of the test.

On the other hand, if a relatively low speed data processor is employed to supply the test words to the unit under test, then a problem of bandwidth arrives. More specifically the testing of many electronic devices involves a matter of reaction time or recovery rate. For example, it may be desired that a counter be able to count at a certain rate. To effectively test the ability of the counter to count at this desired rate, it is necessary that data words be supplied to the unit under test at the rate at which the counter is to count. If the data processor is incapable of supplying data words to the counter at such a desired rate, then it is not possible to effectively test the counter.

OBJECTS

A primary object of the invention is a high-speed digital testing method device capable of transferring a large number of data words through the unit under test substantially independently of a data processor, thereby substantially eliminating any correlation between the rate of transfer of data words through the unit under test and the operating speed of the data processor.

A second object of the invention is a high-speed digital testing system in which only a relatively small amount of engineering time is required to prepare the programming necessary for a given test.

A final object of the invention is a method for testing electronic devices by passing a very large number of test data words through the unit under test at a high word rate, independently of bulk storage and independently of the operating speed of a data processor, and further, checking the accuracy of the unit under test by periodically comparing the circulating data word with corresponding data words previously stored from a similar test made on a known good electronic device of the type being tested.

STATEMENT OF INVENTION

The invention includes both a method of and the apparatus for performing the method. The apparatus comprises a group of logic circuits which are arranged, under control of a master control logic means, into three different logic configurations, as follows:
1. Initialization mode of operation.
2. Characterization mode of operation.
3. Testing mode of operation.

In performing the process the apparatus is caused to assume the aforementioned modes of operation in the following sequence:
1. Initialization mode of operation for known good unit.
2. Characterization mode of operation for known good unit.
3. Initialization mode of operation for unit under test.
4. Testing mode of operation for the unit under test.

PROCESS INVENTION

In accordance with the process invention, a known good unit of the type to be tested is obtained by statistical or analytical testing methods. The statistical method would involve testing a plurality of units and deciding that the largest group of units complying with certain requirements must comprise "known good units." The analytical methods can be quite varied, but in essence they comprise the derivation of a truth table and the inspection of the device in a manner compatible with the desired truth table results. The units which favorably compare in test results to the generated truth table will then be assumed to be "known good units." However, this will not be delved into further since the means for obtaining a known good unit is known in the art and is not pertinent to the practice of the present invention.

A known good unit is first supplied with a predetermined sequence of initializing data words from a data processor which functions to place the known good unit in a predetermined condition. The foregoing occurs during the initialization mode of operation.

Upon completion of initialization, the characterization mode of operation begins. During the characterization mode, a transfer function is connected across the known good unit and the data word is circulated at a high rate of speed around the loop known herein as the transfer loop and comprising the known good unit and the transfer function, with said data word being altered each time it passes through the transfer function. At periodic intervals, which may be every Nth circulation of the data word around the transfer loop, said data word is sampled and supplied to the data processor where it is stored. Thus at the end of the characterization mode of operation, there is stored in the data processor system a truth table of sampled data words taken from a unit known to be good.

Next, a unit to be tested, referred to herein as the UUT (unit under test), is then connected into the testing apparatus and initialized in precisely the same manner as was the known good unit, so that at the end of initialization the UUT is in exactly the same state as was the known good unit at the end of its initialization. The test cycle is then begun and is performed in a manner similar to the characterization of the known good unit. More specifically, in the test cycle the transfer function is connected across the UUT and the data word is circulated through the transfer loop comprising the UUT and the transfer function.

Every Nth circulation (or other appropriate time interval fixed or varied in a predetermined manner) of the said data word, said data word is sampled and supplied to a compare function, to which is also supplied the samples of the known good unit which are contained in the truth table stored in the data processor system. As long as coincidence occurs between the sampled data words from the unit under test (UUT) and the corresponding words from the truth table in the data processor, the unit is deemed to be good. However, when a non-coincidence between these two words occurs the unit is adjudged to be defective and the test is aborted, with appropriate signals being given to the data processor and to a human operator.

APPARATUS INVENTION

Structurally, the invention comprises a test station into which either the known good unit or a UUT is placed, and electronically connected into the testing apparatus. The structure of the invention further comprises a number of logical elements which are caused to assume various modes of operation in accordance with the sequence of the process invention as listed above, and under the general control of a master control logic means which operates in conjunction with a data processor. These other logic elements of the invention comprise a transfer function means, a compare function means, and appropriate counting and storage means within the master control logic which will respond to certain instructions from the data processor to determine the various parameters of the test. Such parameters include the number of steps in the initialization mode of operation, the number of samplings in the characterization and testing modes of operation, the number of circulations of the data word between each sampling, and the rate of speed of circulation of the data word.

The transfer function, the compare function, and the master control are identified herein collectively as the feedback sequence control circuit, since they operate together to control the flow and processing of data in the system.

In the initialization mode of operation, the master control logic functions to enable gating means to connect the output of said data processor to the master control logic and also to the electronic device in the test station, which can be either the known good unit or the UUT. The data processor will then supply a series of instruction words to the master control logic to set the various counting and storage means therein, thereby determining the parameters of the initialization, characterization, and testing modes of operation which are to follow. The master control logic will also function to gate a series of initialization data words from the data processor to the device in the test station to initialize said device to a known condition.

During the initialization mode, the logical configuration of the apparatus is such that the transfer function and the compare function are both disabled, and further is such that there are no data words transferred from the device being tested back to the data processor.

In the characterization mode of operation, the transfer function means, under control of the master control logic, is connected across the electronic device which has been initialized. Timing means, also under control of the master control logic, functions to circulate an initially determined data word around the transfer loop comprising the electronic device and the transfer function. This circulation of such a data word is at a much higher rate of speed than can be obtained in the transfer of data words from the data processor to the electronic device and further, is self changing in a pseudo-random manner. This pseudo-random manner is repeatable for a complete test cycle for each unit tested which responds in the same manner as the known good unit.

The master control logic means further comprises structure for sampling the circulating data word every Nth circulation thereof and for supplying said sampled data word to the data processor, which in turn stores said sampled data words in the same order as they are received in appropriate bulk storage means such as main core memory or magnetic tape. Such storage of the sampled data words constitutes a truth table which is employed, during the testing mode of operation, as a reference to determine if any given UUT is defective or good.

In the testing mode of operation a unit under test (UUT) is placed in the test station of the testing apparatus. Initialization of the UUT is first obtained in the same manner as discussed in connection with the known good unit so that testing of the UUT will commence with the UUT being in exactly the same initial condition as was the known good unit.

In the testing mode of operation, the master control logic functions to enable appropriate gating means to connect the transfer functions across the UUT and to provide the aforementioned timing means to circulate an initially determined data word around the transfer loop comprising the UUT and the transfer function. The said initially determined data word is the same as was employed at the beginning of characterization of the known good unit. Further the rate of speed of circulation of the data word is made identical to that employed during characterization of said known good unit.

The master control logic further functions to sample the circulating data word every Nth circulation thereof so that the samplings of the UUT occur at times which correspond precisely to the times of samplings made of the known good unit during the characterization mode of operation. Thus, if the UUT and the known good unit are the same, within given tolerances, the sequence of sampled data words being obtained currently during the testing mode of operation will be exactly the same as the sequence of sampled data words taken during the characterization mode of operation and which are stored in the data processor system. To determine if the UUT meets the standards of the known good unit, the sequence of currently sampled data words are sequentially compared, in the compare function, with the sequence of stored sampled data words. If coincidence exists between each successive pair of compared words, the unit is deemed to be good. However, if any pair of compared data words are not coincident, then the unit is deemed to be bad and, under control of the master control logic, the test is terminated.

FEATURES OF INVENTION

In accordance with a feature of the invention, the data processor is employed at a relatively low data word rate, not only in the initialization mode of operation but also during the characterization mode when it is receiving samplings, and during the testing mode when it is supplying said stored data words to the compare function means. On the other hand the circulation of data words around the transfer loop, both during characterization and testing, occurs at a very high rate of speed substantially completely independent of the speed capabilities of the data processor.

In accordance with another feature of the invention, the master control logic is constructed to monitor the compare function means and to interrupt the circulation of data around the transfer loop if the proper stored data word from the data processor truth table has not been supplied to the compare function at the time the corresponding sample data word taken from the circulating data word is to be supplied to the compare function. The foregoing is necessary since the input/output device of the data processor is relatively slow compared to the circulation rate of the data words around the transfer loop, and it is possible that a sampled data word from the circulating data word could be supplied to the compare function before the data processor could supply the corresponding data word from its stored truth table.

FIGURES

The above-mentioned and other objects and features of the invention will be more fully understood from the following detailed description thereof when read in conjunction with the drawings in which.

Figure 4A:
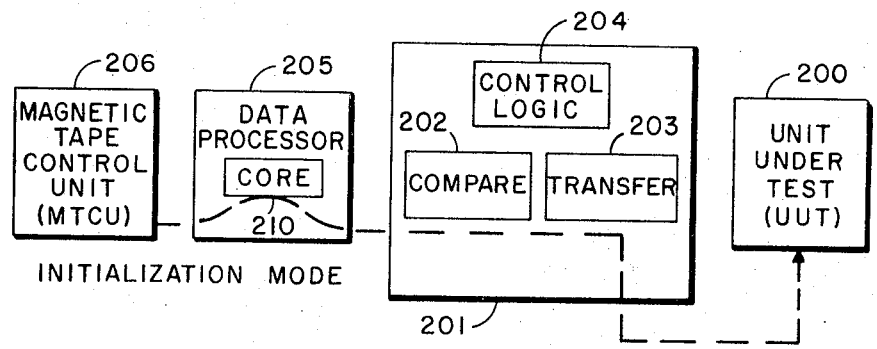
Figure 4B:
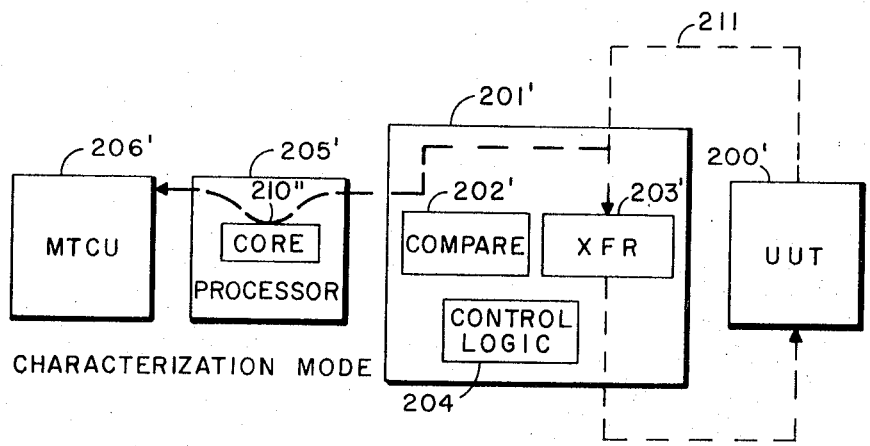
Figure 4C:
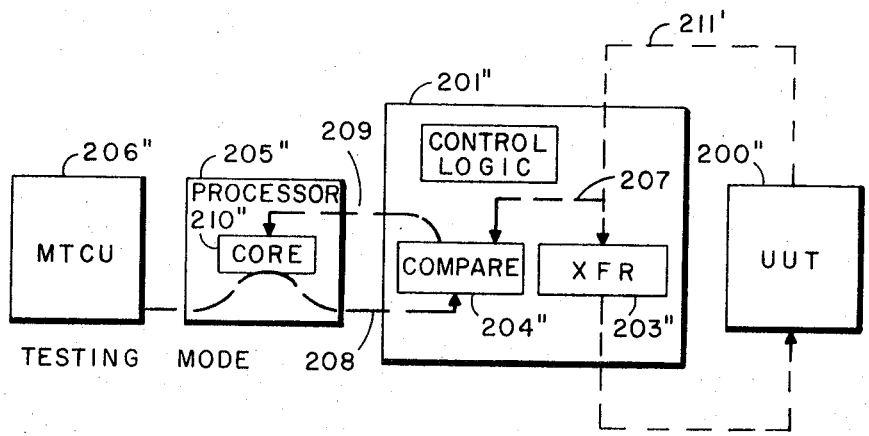
Figure 5:
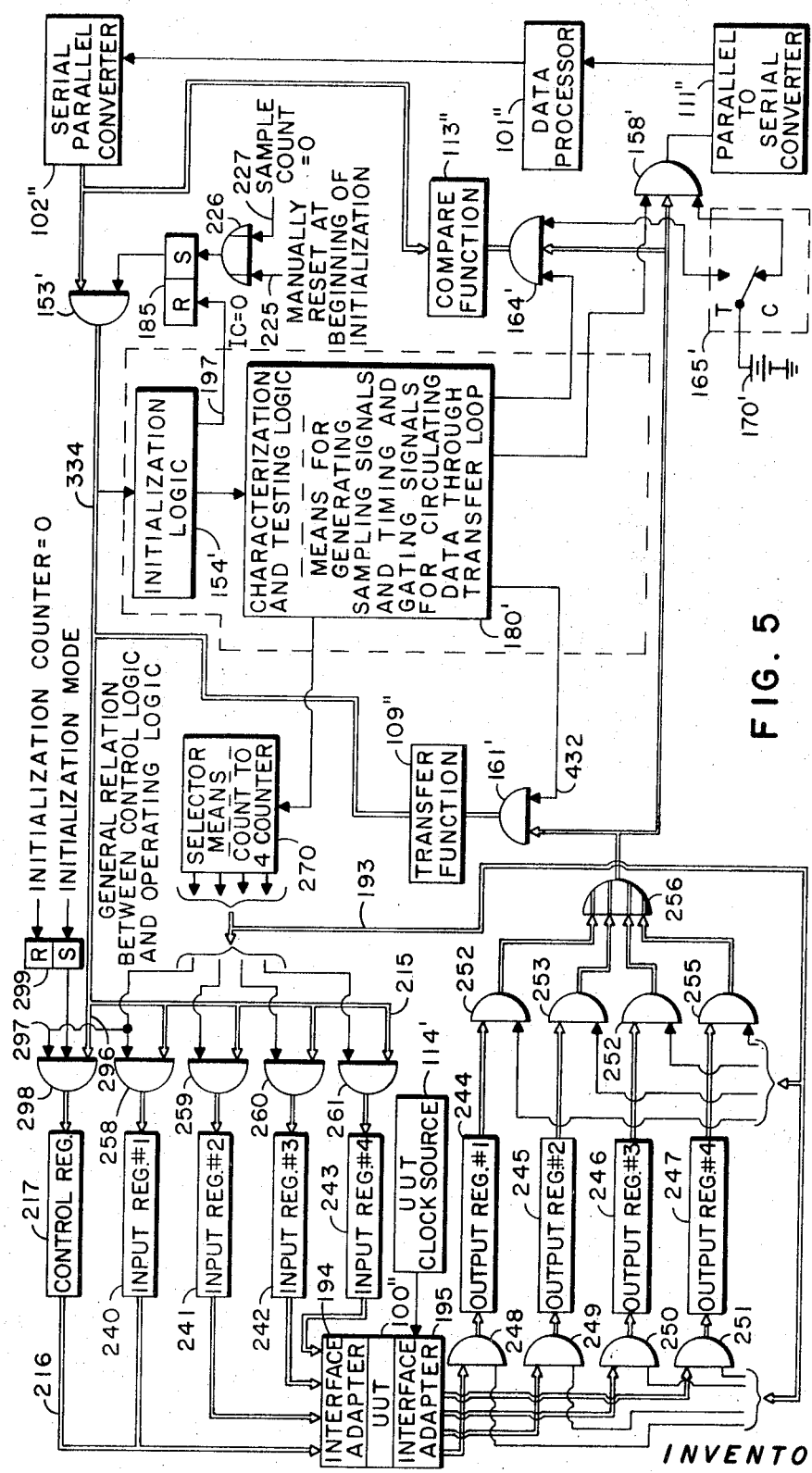
Figure 6:
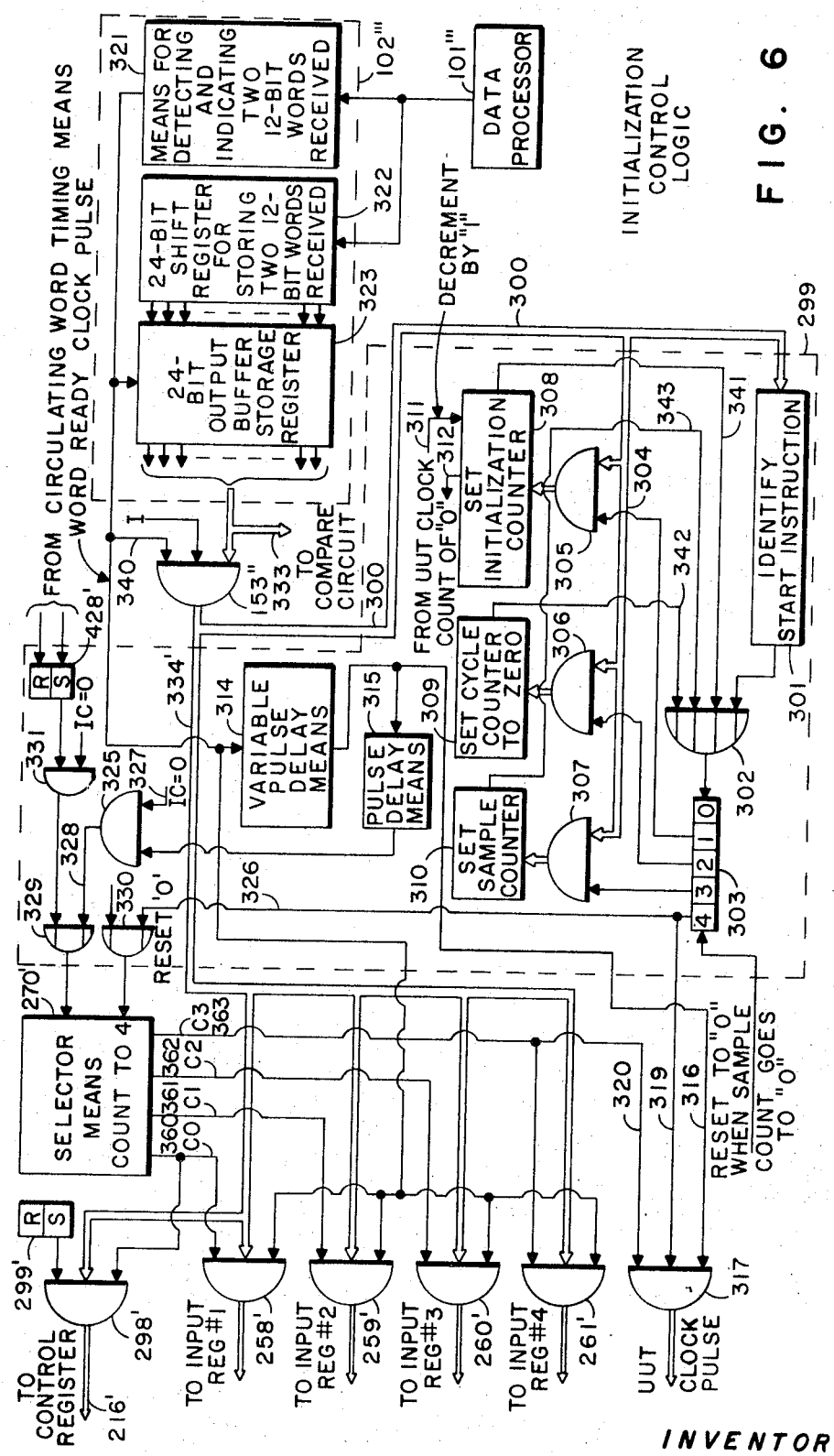
Figure 7:
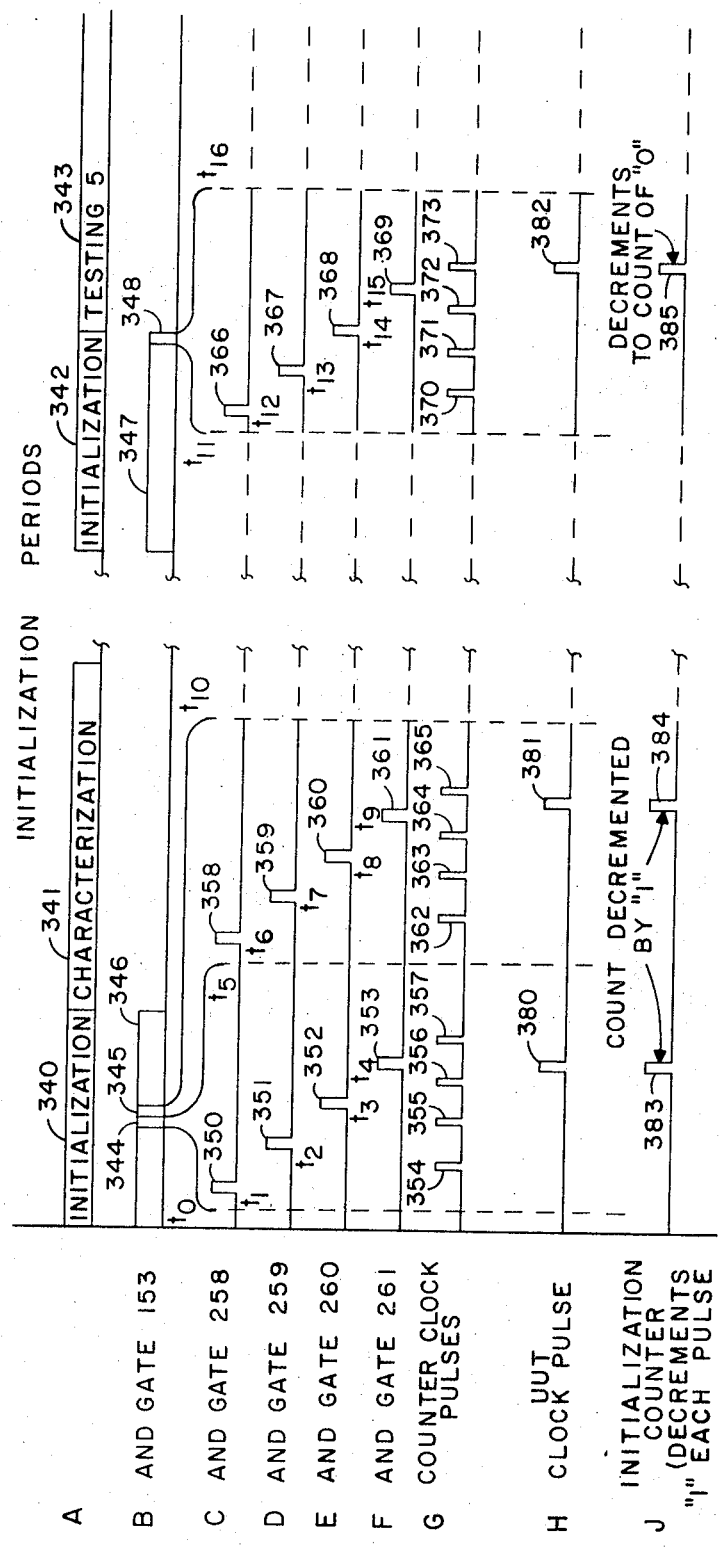
Figure 8:
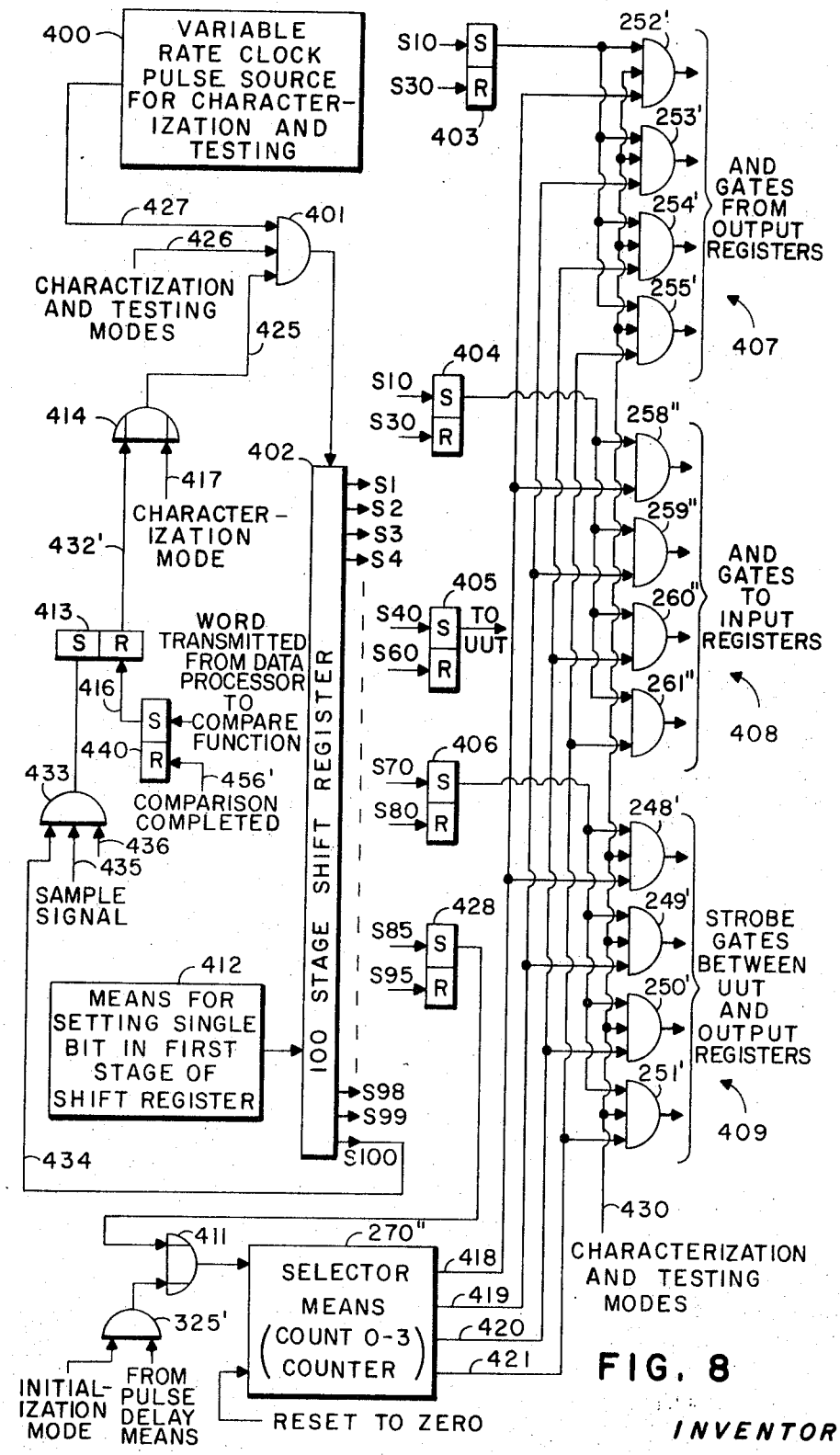
Figure 9:
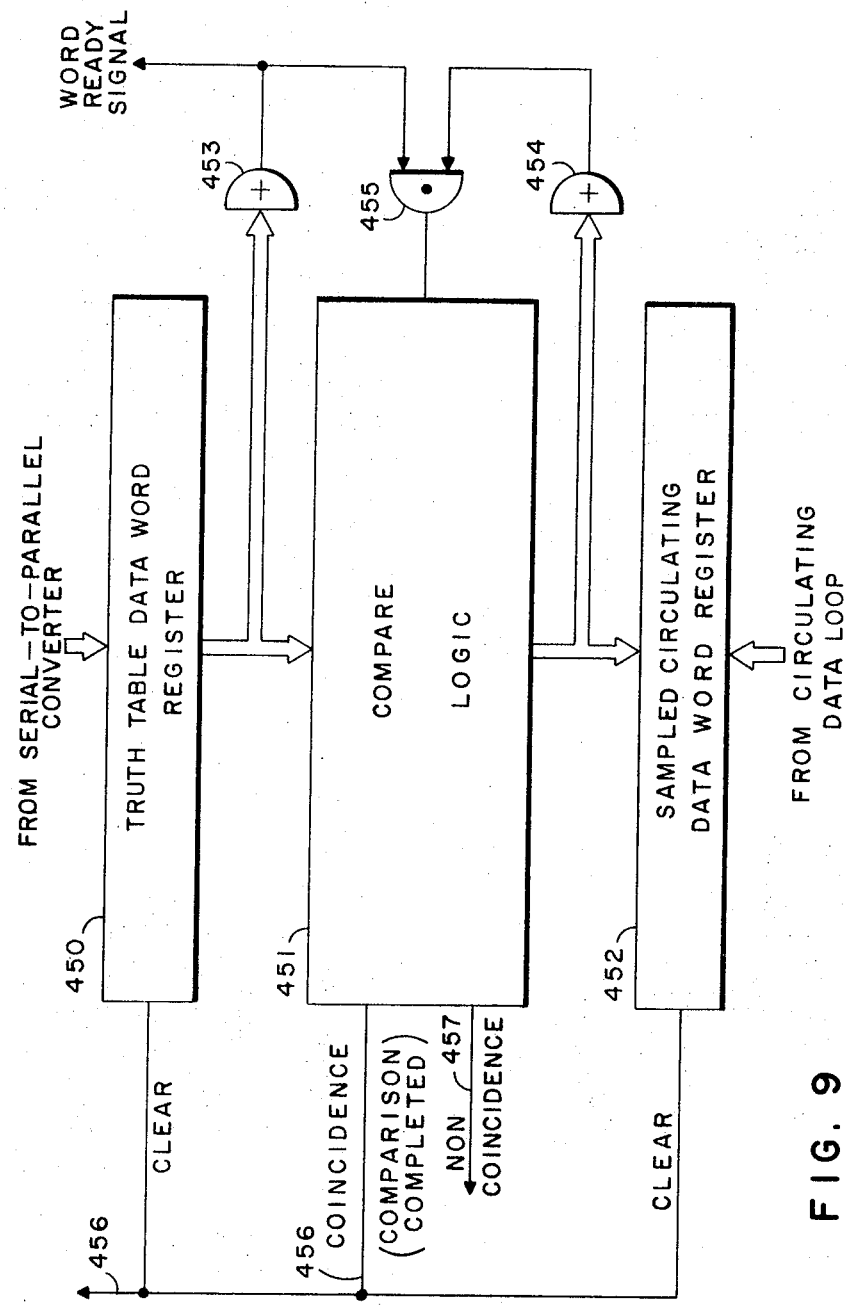
Figure 10:
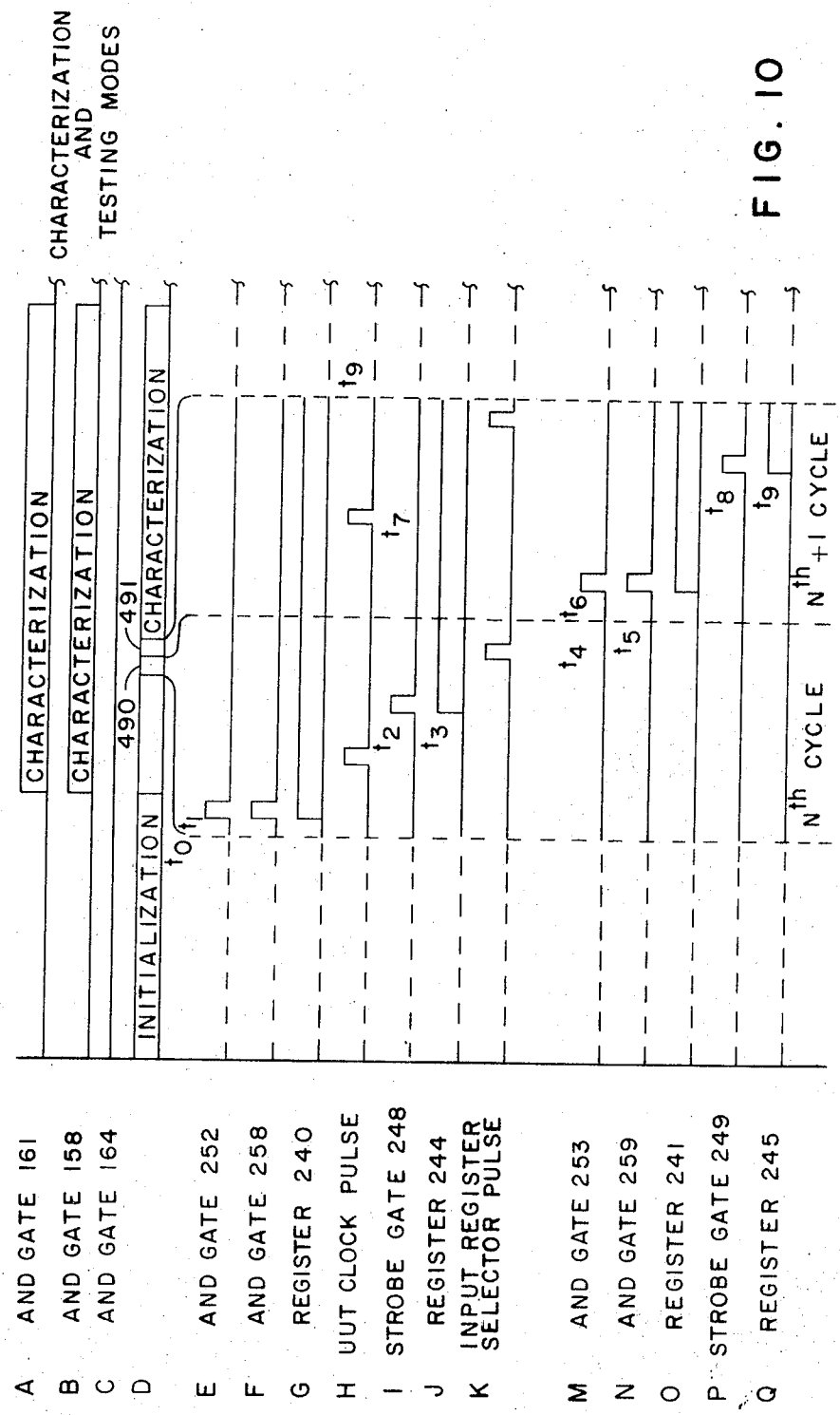
Figure 11:
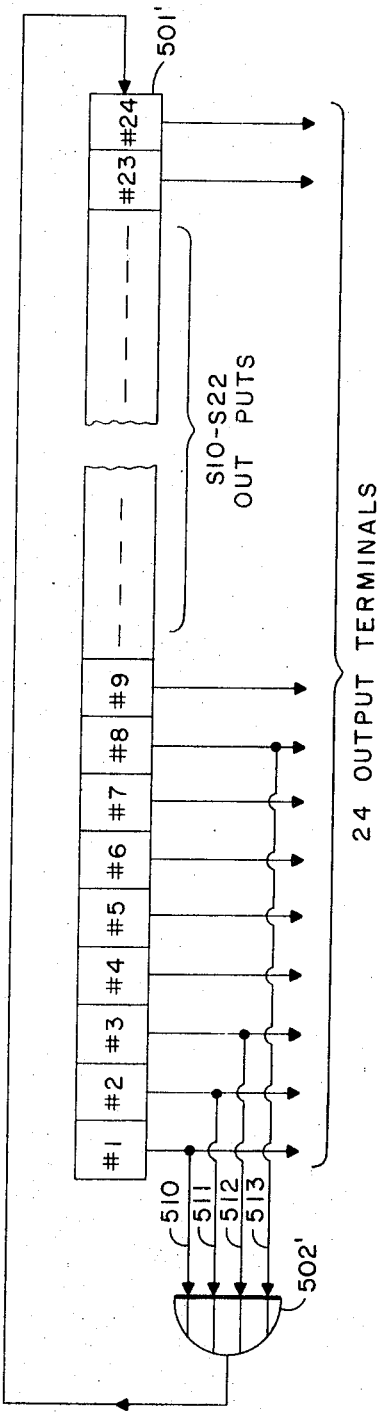
Figure 12:
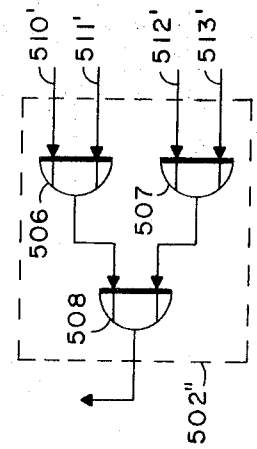
Figure 13:
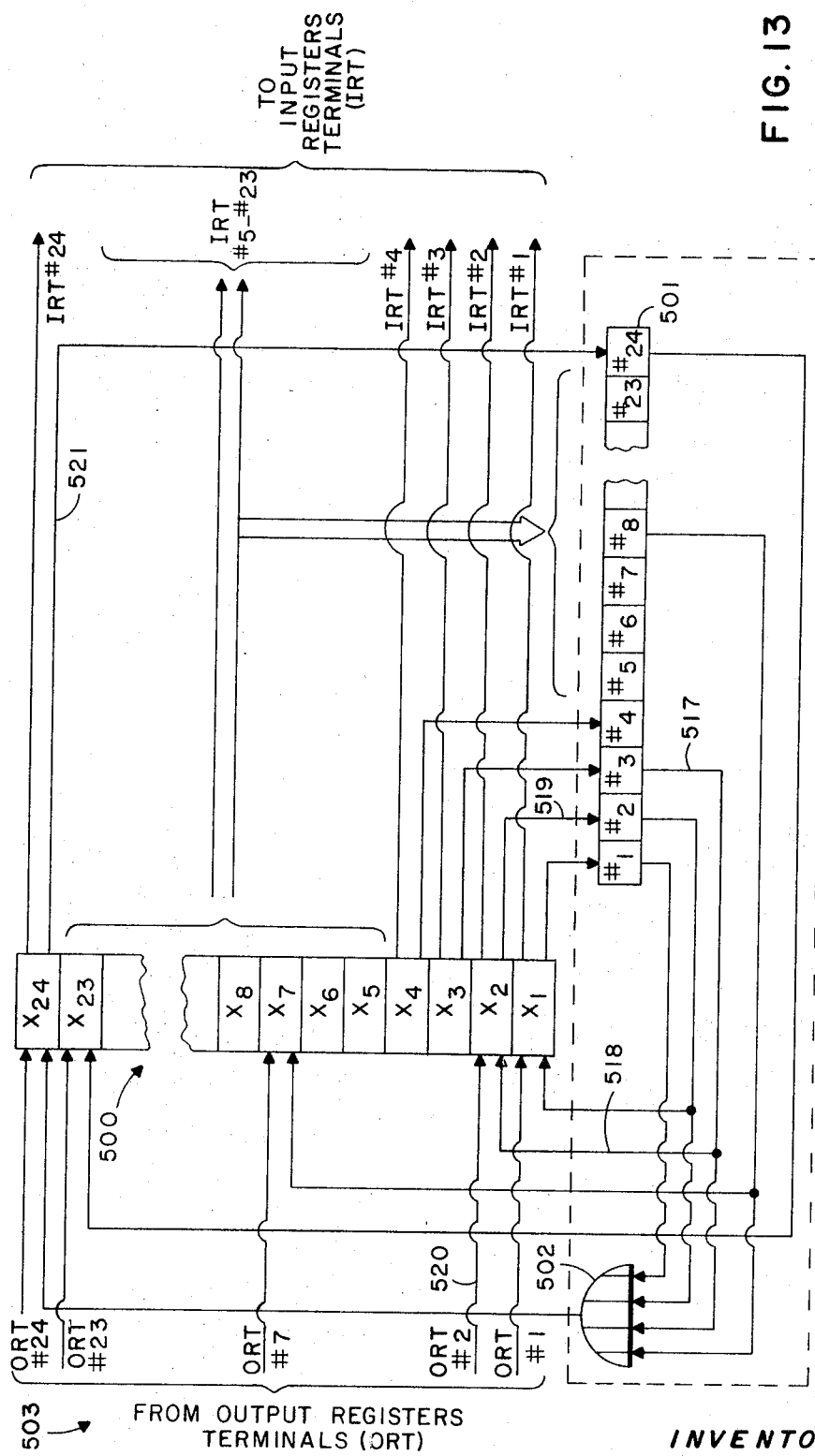

FIGS. 4A, 4B, and 4C are a set of three figures showing the flow of information in the system in each of the three basic modes of operation; e.g., initialization, characterization, and testing;

FIG. 5 is a more complex logic diagram of the invention adapted to test a UUT having a large number of input and output terminals and including for such purpose means for supplying a plurality of words to the UUT and more specifically providing for separate circulating paths through or between the UUT and the transfer function;

FIG. 6 is a logic diagram of a logic circuit employed to effect the initialization mode of operation which precedes both the characterization and the testing modes of operation;

FIG. 7 is a set of waveforms showing the operation of the invention during the initialization periods;

FIG. 8 is a logic diagram which shows a logic for generating the various gating pulses required in the circulating loop during characterization and initialization, with said logic providing for variable length gating pulses in accordance with the particular test requirements of a particular unit under test;

FIG. 9 shows a more detailed diagram of the compare function logic;

FIGS. 10 and 10A show a set of waveforms illustrating the operation of the circuit during characterization and testing modes;

FIG. 10B shows how FIGS. 10 and 10A fit together;

FIG. 11 is a logic diagram showing a pseudo-random generator utilized in the transfer function of the invention;

FIG. 12 is a detailed logic diagram of a small portion of FIG. 10;

FIG. 13 shows a line design diagram of the transfer function including the pseudo-random generator of FIG. 10.

The specifications will be set forth in accordance with the following organization:

I. GENERAL DESCRIPTION
A. INITIALIZATION MODE OF OPERATION (FIG. 1)
B. CHARACTERIZATION MODE OF OPERATION (FIG. 1)
C. TESTING MODE OF OPERATION (FIG. 1)
D. PROCESS (FIG. 2)
E. MASTER CONTROL LOGIC (FIG. 3)
F. MULTIPLE TRANSFER LOOP SYSTEM (FIG. 5)
  1. Initialization Mode
  2. Characterization Mode
  3. Testing Mode
II. DETAILED DESCRIPTION
A. INITIALIZATION MODE OF OPERATION
B. CHARACTERIZATION MODE OF OPERATION
C. TESTING MODE OF OPERATION
D. TRANSFER FUNCTION

I. GENERAL DESCRIPTION

Figure 1:
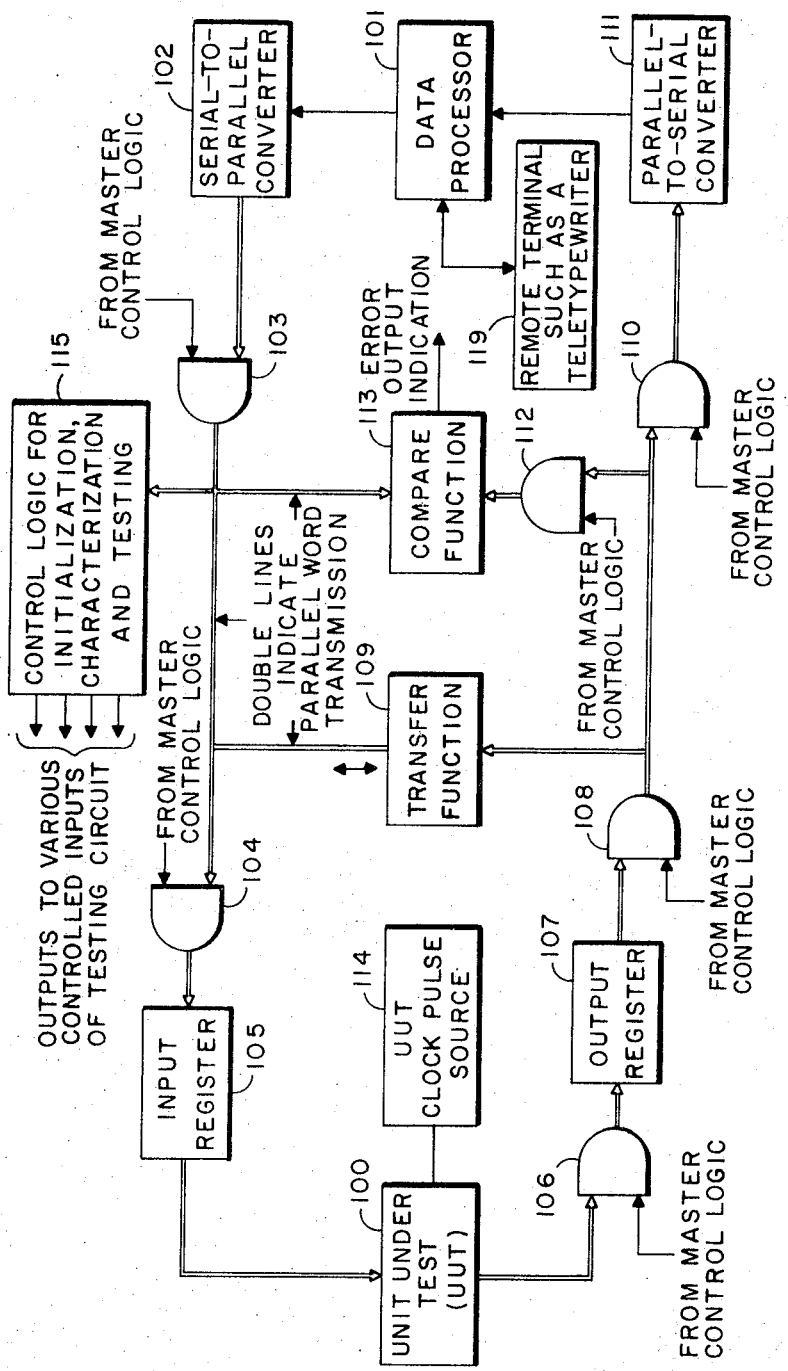
FIG. 1 is a logic diagram of the basic concept of the invention.

Referring now to FIG. 1, there is shown the logic diagram of the general organization of the invention. During a complete testing operation the logic of FIG. 1 actually forms three different logic circuits; a first logic circuit effecting the initialization mode, a second logic circuit for effecting the characterization mode of operation, and a third logic circuit for executing the testing mode of operation. Each of these logic circuit forms and the associated mode of operation will be considered separately.

IA. INITIALIZATION MODE OF OPERATION

In the initialization mode, the logic of FIG. 1 functions to place the electronic device being tested, designated by block 100, into a known state. As discussed briefly above, an initialization mode of operation occurs both before the characterization mode of operation and also before the testing mode of operation. In the initialization mode which occurs before the characterization mode, a unit of the type to be tested and known to be a good unit is positioned in the testing system as represented by block 100. Such a unit, referred to herein generally as test unit, can be either a known good unit, which is tested during the characterization mode of operation to establish a reference set of data words, or it can be a unit under test (UUT) which is tested during the testing mode of operation. Such a test unit can be any electronic device from a small digital component to a data processor system.

During the initialization period the data processor 101 functions to supply a pre-programmed sequence of data words including instruction words and initialization words to the system. More specifically the initialization words are supplied to test unit 100 through a circuit including serial-to-parallel converter 102, AND-gate 103, AND-gate 104, and input register 105. Such sequence of initialization words will perform the basic function of causing the test unit 100 (assumed at this point to be a known good unit) to assume a known condition from which characterization will begin. It is to be noted that all subsequently tested units of the same type as the known good unit will also be initialized to the same known condition so that the testing thereof can be compared with the characterization results of the known good unit.

The instruction data words, which actually precede the initialization data words, function to set certain counters in the master control logic 115 which function to control the test parameters during the initialization period and also during characterization and testing periods.

AND-gates 104 and 103, as well as AND-gates 106, 108, 110, and 112 are caused to be opened or closed in accordance with a particular mode of operation of the circuit. In the initialization mode AND-gates 103 and 104 are opened, i.e., conductive, and AND-gates 106, 108, 110, and 112 are closed, i.e., nonconductive. The serial-to-parallel converter 102 is not a necessary part of the invention and is employed only because the data processor 101 is assumed to supply its output words in serial form, whereas the various modes of operation of testing one designed system employ data words in parallel form. If a data processor capable of supplying and receiving words in parallel form were employed, then both the serial-to-parallel converter 102 and the parallel-to-serial converter 111 would be eliminated from the system and replaced with simpler buffer storage devices.

The end of the initialization period is marked by some suitable means such as, for example, an initialization counter (included in master control logic 115 but not specifically shown in FIG. 1) initially set to indicate the number of words in the initialization mode, and decremented by each supplied initialization data word. When such counter decrements to zero the end of the initialization mode is thereby indicated and the characterization mode is initiated.

It should be noted that some suitable means, such as teletypewriter 119, is provided to enable an operator to communicate with the system through the data processor. The teletypewriter can be employed by the operator, for example, to supply test parameters to the system, to initiate operation of the system, to receive information from the system indicating whether a test has been successful or unsuccessful, and in general supply or receive any information needed.

IB. CHARACTERIZATION MODE OF OPERATION

In the characterization mode a new arrangement of the logic elements in FIG. 1 is made. Such new arrangement includes the test unit 100, AND-gate 106, output register 107, AND-gate 108, transfer function 109, AND-gate 104 and input register 105 as well as gate 100 and converter 111. The output from data processor 101 is cut off during the characterization mode by the closing of AND-gate 103.

The basic concept of the characterization mode is to circulate the initially determined data word, left in the known good unit after initialization, through the transfer function 109 and then back through the known good unit, many times at a high rate of speed. The data word is circulated in parallel form. Alterations are made in said data word each time it passes through the known good unit, and each time it passes through the transfer function 109. The specific circuit path for this high-speed data word circulation can be traced from the known good unit 100, through AND-gate 106, output register 107, AND-gate 108, transfer function 109, AND-gate 104, input register 105 and back to known good unit 100. The aforementioned circuit is identified herein both as a closed loop circuit and also as the transfer loop.

The transfer function 109 functions to effect pseudo-random changes in the data word each time said data word circulated therethrough. However, said pseudo-random changes are the same for all good UUT's as they are for a known good unit thus providing a basis for comparing UUT's with the known good unit during the testing mode of operation.

Sampling means contained in the master control logic 115 functions to periodically sample the circulating data word by periodically opening gate 110 and supplying the circulating data word to serial-to-parallel converter 111 and then to data processor 101, where sampled data words are stored, for later comparison with samplings of the circulating data word through a UUT during the testing mode. Storage of such sampled data words can be in the form of a truth table in main core in the processor, a magnetic tape, or other suitable bulk storage means under control of the processor.

The determination of which data words will be sampled and stored in said truth table is made by a cycle counter and a sample counter, not specifically shown in FIG. 1 but included in the master control logic represented by block 115.

At this point it is appropriate to define a complete circulation of the data word around the closed loop including the test unit 100 and the transfer function 109. Such a cycle is defined as the propagation of a data word from output register 107, through AND-gate 108, transfer function 109, AND-gate 104, input register 105, test unit 100, and then through AND-gate 106 back into the output storage register 107.

It should be noted that during a given cycle of the data word at least three clock pulses are required. The first clock pulse gates the data from the output register 107 through AND-gate 108 (assumed to be open during the characterization mode), transfer function 109, AND-gate 104, which is gated open simultaneously with AND-gate 108, and into input register 105. A second clocking pulse, known as the UUT clock pulse supplied from source 114 under control of master control logic 115 (not shown), is supplied internally to the test unit where it is utilized to open certain predetermined gating circuits, shift certain shift registers, or to perform other desired functions. A third gating pulse known as a strobe pulse is supplied to AND-gate 106 and functions to supply the new data word appearing at the output of the test unit into output register 107. This strobe pulse completes a cycle of the data word. During this cycle two changes have occurred in the data word, one change occurring within transfer function 109 and the other change occurring within the test unit 100.

Returning again to the means for periodically sampling and storing the circulating data word, there is provided a cycle counter (not specifically shown in FIG. 1) which begins to count at the beginning of characterization, and every Nth count thereof will function to open AND-gate 110, thereby supplying the data word occurring at that cycle to data processor 101 through parallel-to-serial converter 111.

Also provided in the master control logic 115, but not shown specifically in FIG. 1, is a sample counter which counts the number of times that the cycle counter is to sample a data word and supply such word through AND-gate 110 and into data processor 101. Such sample counter is also set at the beginning of initialization to the number of samples desired. Each time a data word is sampled and supplied to data processor 101 the sample counter is decremented by one, until it eventually attains a count of zero, indicating the end of the characterization mode of operation. At this point in time there is stored in the data processor a sequence of data words indicating the response of a known good unit and against which other units of the same type will be compared in order to determine if they are good or defective.

IC. TESTING MODE OF OPERATION

Once characterization of the known good unit has been completed, the testing of other units (UUT's) can begin. Such units are placed in the test position represented by block 100 and are first initialized in exactly the same manner as was the known good unit.

At the end of the initialization the testing mode begins. The testing mode is quite similar to the characterization mode insofar as the circulation of data from the UUT through transfer function 109 is concerned. There is however a difference in the manner in which the sampling of this data is effected and utilized.

More specifically, in the testing mode the circulating data word is sampled at exactly the same corresponding times as was the circulating data word during characterization of the known good unit. However, in the testing mode the sampled data words are not supplied to the data processor 101 but rather are supplied to the compare function 113 through AND-gate 112, which is periodically conductive during the testing mode. The AND-gate 110, conductive during sampling times in characterization, is nonconductive during the testing mode.

The data words stored in the truth table are also supplied to compare function 113 from data processor 101 by means of converter 102 and gate 103. It is to be noted specifically that the data words stored in the truth table are supplied to compare function 113 one at a time and in the same sequence as they were stored. Thus, the first data word sampled during characterization will be compared with the first data word sampled during testing, the second data word sampled during characterization will be compared with the second word sampled during testing, and so on.

If the unit under test is a good unit, then each pair of words compared should coincide, indicating that the UUT is good. If, however, the UUT is defective, then the changes imposed upon the circulating word as it passes through the UUT will be different than the changes imposed thereon when it passed through the known good unit during characterization. All subsequent samples of the circulating data word will be different from corresponding data words in the truth table. Consequently the compare function 113 will show a non-coincidence, indicating a defective unit. Appropriate means are provided in the master control logic 115 to terminate the test at this point. Such means are not shown specifically in FIG. 1 but generally function to supply an error-indicating signal to the parallel-to-serial converter 111, which in turn will provide a signal to the data processor to terminate the test. The test will also be terminated when the last sampling occurs and the sample counter decrements to zero. Again the logic for such termination is not specifically shown in FIG. 1 but is effected generally by signals supplied to the data processor 101 through the parallel-to-serial converter 111.

ID. PROCESS

Figure 2:
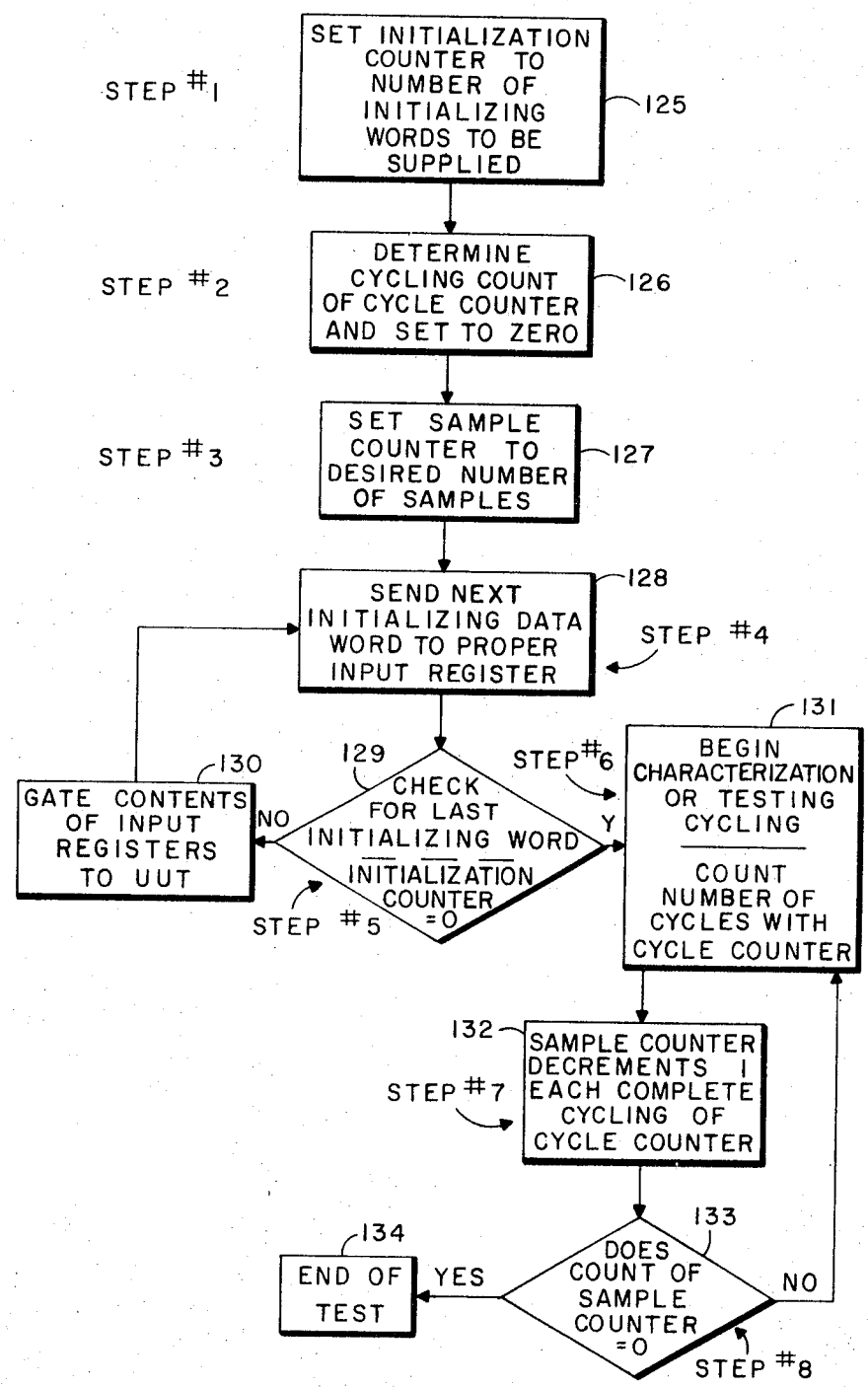
FIG. 2 is a chart showing the basic steps involved in the process invention.

Referring now to FIG. 2, there is shown a flow chart illustrating the steps in the operation of the invention beginning with the initialization and following with the characterization and/or the testing sequence. Consider first the initialization mode which includes steps No. 1, No. 2, No. 3, No. 4, and No. 5. Step No. 1 functions to set the initialization counter to the number of initialization words to be supplied by the data processor during the initialization sequence. In step No. 2 a comparison portion of the cycle counter is set to a predetermined termination count which determines the number of cycles between samples. In step No. 3 instruction words are supplied to set the sample counter in the master control logic, thereby determining the number of samples taken during the characterization or the testing modes. More specifically the sample counter is set to some given number, for example 250, and decremented once each time the cycle counter cycles through its maximum count. When the sample counter decrements to zero the test is completed.

After the instruction words have been supplied to the system in steps No. 1, No. 2, and No. 3 of the initialization period, the initializing data words are supplied to the test unit, as indicated in step No. 4. Decision logic, shown within block 129, is provided in the master control logic to check the initialization counter after each initialization word has been supplied to the system to determine if such word is the last initializing word. If it is not the last initializing word, the master control logic functions through block 130 to cause the system to receive another initializing word.

The last initialization word is also used, as indicated by the double data flow arrow in FIG. 1, to initialize the transfer function 109.

When the last initializing word has been received, as indicated by the initializing counter decrementing to zero, then step No. 6 commences, as defined in block 131. If a known good unit is being tested the characterization cycle begins at this time. On the other hand, if a unit is being tested the testing cycle will commence. The cycle counter functions to count the number of cycles of the data word through the transfer function. After N such cycles the sample counter is decremented by one as indicated by step No. 7. As previously mentioned, during initialization a sample counter was set to a given value, as for example 250, to determine the total number of samples to be taken during characterization or testing.

When the sample counter decrements to zero, the decision logic 133 functions to effect step No. 8 to detect such condition and causes the end-of-test routine to occur, as indicated by block 134. However, until the sample counter decrements to zero the decision logic 133 will function to cause cycling to continue and the cycle counter to continue to count.

IE. MASTER CONTROL LOGIC

Figure 3:
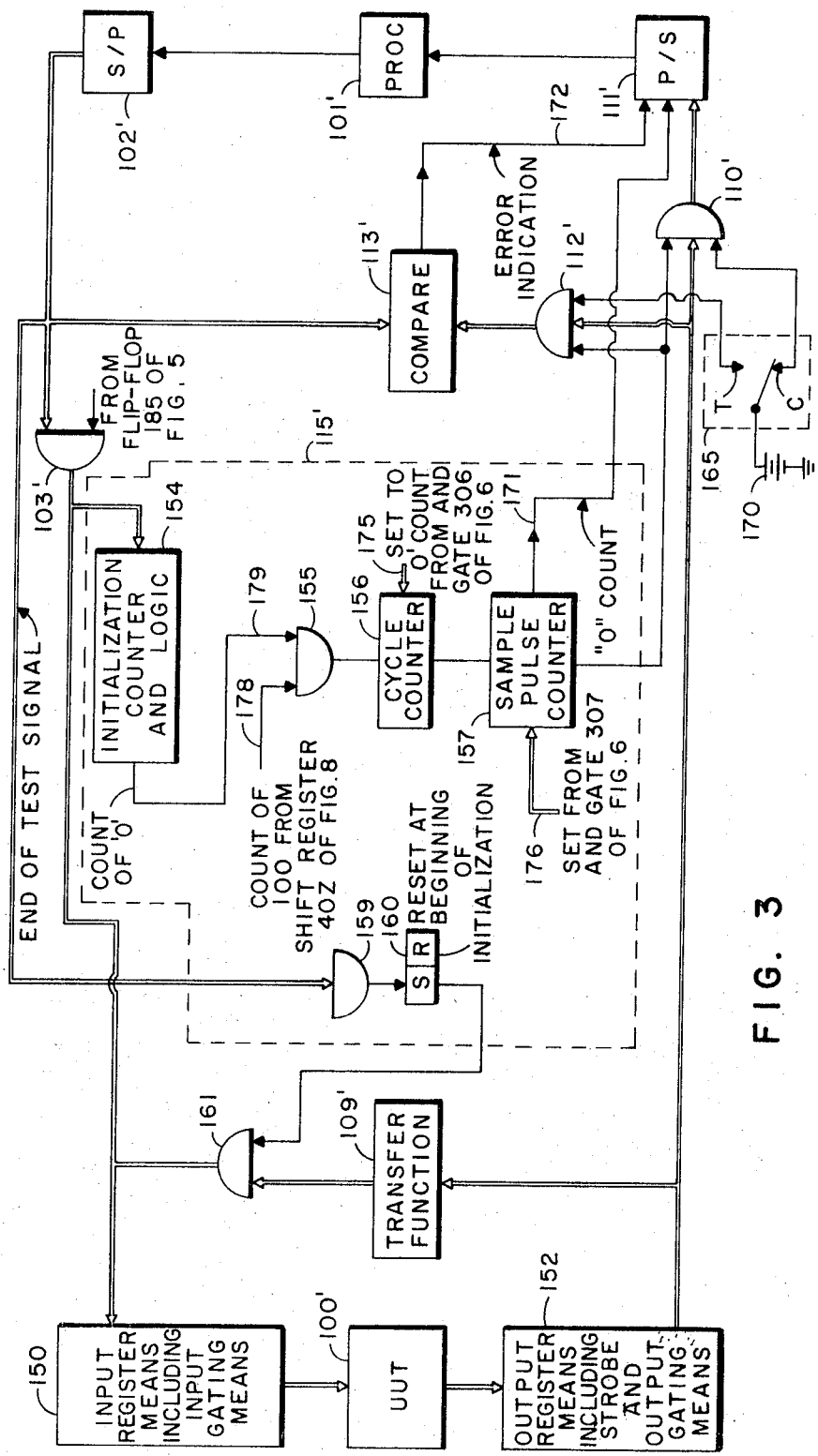
FIG. 3 is another logic diagram showing the general organization of the operating circuit and the master control logic which controls said operation.

Referring now to FIG. 3 there is shown another general block diagram of the invention, including a general logic diagram of the master control logic. As indicated above, a plurality of input and output registers, as well as the single input and output registers, can be employed in those cases where the number of input terminals and output terminals of the UUT are large. Thus in FIG. 3 the input register means 150 and the output register means 152 are shown generally and can each represent either one register or a plurality of registers, such as is shown in FIGS. 5 and 6, for example. The blocks 150 and 152 also represent the input, output, and strobe gates connected thereto and represented generally in FIG. 1 by reference characters 104, 106, and 108.

As can be seen from FIG. 3, the same logic blocks are shown therein as are shown in FIG. 1. More specifically, FIG. 3 shows a transfer function of 109', a compare function 113', a data processor 101', a serial-to-parallel converter 102', a parallel-to-serial converter 111' and a UUT 100'. Also shown in FIG. 3 are several of the gates shown in FIG. 1, such as AND-gates 112', 110', and 103'.

In addition there is shown in FIG. 3 a general block diagram of the master control logic which includes initialization counter and associated logic 154, the cycle counter 156, and sample pulse counter 157.

Also shown in FIG. 3 are means to end the test including an AND-gate 159 which responds to an end-of-test signal from processor 101', and a switching means such as flip-flop 160 which responds to the output of the AND-gate 159 to disable AND-gate 161 and thereby terminate the circulation of the data through transfer function 109' and UUT 100'.

Such end-of-test signal can come about in one of two ways. Firstly, it can occur as a result of a normal test completion where the UUT has proven to be good and the sample counter has decremented to zero. In this case a signal is supplied from sample pulse counter 157 at the count of zero, through lead 171 to the parallel-to-serial converter 111', which is constructed to respond to such a signal to generate and supply a data word to the data processor 101' indicating the end of test. The data processor in turn responds to such word to generate an end-of-test signal which is supplied via the serial-to-parallel converter 102', and AND-gate 159 to set flip-flop 160, thereby disabling AND-gate 161 and interrupting the circulation of data through the transfer function 109'.

The second means by which the test can be terminated is by non-coincidence of a data test word and the corresponding word from the truth table in processor 101'. Under such conditions the compare circuit 113' will supply a signal via lead 172 through the parallel-to-serial converter 111' to processor 101' indicating that the unit is defective and that the test should be aborted. The processor 101' will then generate an end-of-test signal which will be supplied through AND-gate 159 to set flip-flop 160 and disable AND-gate 161.

Consider now the relation between the initialization counter, the cycle counter and the sample pulse counter. At the beginning of the initialization mode, an instruction word is supplied from the processor 101' to the initialization counter in logic block 154 through AND-gate 103', which is enabled during initialization. The initialization logic responds to the instruction word to enable setting of the initialization counter, the cycle counter 156 and the sample pulse counter 157 with the next several instruction words, as indicated generally in the logic flow diagram of FIG. 2. More specifically the first instruction word after the initialization mode address of word can function to set the initialization counter to the number of initialization words to be employed. The following two instruction words can be then employed to set the cycle counter to zero and also to set the maximum count of the cycle counter. The next instruction word can be employed to set the sample pulse counter to the number of samples to be taken during the characterization and the test modes. Logic means, not shown specifically in FIG. 3, are employed to sequentially route successive instruction words from the initialization counter to the cycle counter and then to the sample pulse counter.

It is to be understood that the setting of the initialization counter, the cycle counter and the sample pulse counter all occur during the first part of the initialization mode. During this part of the operation the AND-gate 103' is conductive and AND-gates 112' and 110' are nonconductive. Also, as will be shown later, the AND gates associated with the input and output terminals of the output registers 152 are both nonconductive since no circulation of data words through the transfer function 109' occurs during the initialization period. The only transmission of data words is from processor 101' into the master control logic including the initialization counter in logic 154, the cycle counter 156 via input 175 and the sample counter 157 via input 176. Data words are subsequently supplied into UUT 100' through input register means 150.

Some means are required to indicate the completion of a cycle of data circulation during the characterization and testing modes in order for the cycle counter 156 to count. Such means is provided via lead 178 to AND-gate 155. While the precise derivation of the cycle completion pulses appearing on input 178 will be explained later herein, it will suffice for the present to state that a pulse will be supplied to input lead 178 at the completion of a cycle, as defined hereinbefore, and such cycle completion pulse will pass through AND-gate 155, during the characterization and testing modes, into cycle counter 156 where the cycles are counted. It is to be understood that the other input lead 179 to AND-gate 155 will have a signal thereon during the characterization and testing modes, thereby enabling AND-gate 155 during these two modes of operation. A specific logic by which the foregoing can be accomplished is as follows. The initialization counter 154 is originally set to some number which is equal to the number of initialization words. When the initialization counter decrements to zero the initialization is complete, and a signal appears on lead 179 to enable AND-gate 155.

As discussed briefly above there are differences between the characterization and testing modes of operation of the system. During the characterization mode AND-gate 110' must be open at specific times so that the sampled data words are supplied to processor 101' through parallel-to-serial converter 111'. During this characterization mode AND-gate 112' must be disabled since no comparison is to occur. On the other hand during the testing mode comparison does occur but no data words are to be supplied to processor 101'. Consequently, during the testing mode AND-gate 110' is disabled and AND-gate 112' is enabled. Such switching of AND-gates 110' and 112' is accomplished by means of switch 165, which can be a manual switch preset by the operator prior to initialization. If characterization is to follow initialization, the movable arm of switch 165 is made with contact C. If testing is to follow initialization, the armature is made with contact T.

While the switch 165 can be manually set by an operator since there is ordinarily an interval of time between characterization and the testing of UUT, it is apparent switch 165 could also be an electronic switch automatically set from the C-contact to the T-contact upon completion of the characterization mode, and remain in the test mode with contact T thereafter. Such an electronic switch could be in the form of a simple flip-flop circuit originally set by the operator in a first position to cause characterization to occur, and then, upon completion of characterization, as indicated by the first decrementation of the sample counter to zero, for example, to be reset and remain reset thereafter through multiple testing operations, until again manually set by the operator for a new characterization.

Referring now to FIGS. 4A through 4C there are shown the data paths for the three basic modes of operation. More specifically, in FIG. 4A there is shown the data flow path during the initialization mode, in FIG. 4B, the data flow path during characterization, and in FIG. 4C, the data flow path during the testing mode. It is to be noted that in each of the three FIGS. 4A, 4B, and 4C the flow of data at the relatively low rate of the data processor is shown in heavy dotted lines and the flow of data at the high-speed rate through the transfer loop is shown in light dotted lines.

In FIG. 4A the initialization instruction data words are supplied at a low rate of speed from suitable bulk storage means, such as a magnetic tape unit 206 under control of data processor 205 having a main core memory 210. The data is then supplied through a portion of the feedback sequence control circuit 210 (which includes the master control logic 204, the transfer function 203 and the compare function 202), to the device being tested 200, which can be either a known good unit or a UUT.

In FIG. 4B there is shown the data flow for the characterization mode of operation. It can be seen that in FIG. 4B there are both low speed and high-speed rates of data transmission. The high-speed data rate path extends around the transfer loop 211 which includes the UUT 200', or in case of characterization the known good unit, and the transfer loop 203', as well as input and output registers and AND gates associated therewith but not shown in FIGS. 4A, 4B, and 4C.

The low speed data transmission path extends from transfer function 203', to tape unit 206' through data processor 205'. This low speed data comprises the data word sampled periodically from the data word circulating around the transfer loop and supplies said sampled data words to tape unit 206' to form the truth table which later is used for comparison with similar sampled data words during testing of a UUT.

In FIG. 4C, which shows the data paths for the testing mode, a high-speed data path exists around the closed loop circuit including the UUT 200'' and the transfer function 203''. There is also a slow-rate data path from the transfer loop 211' to compare circuit 204'' and designated by reference character 207. A second slow-rate data path 208 exists from tape unit 206'', under control of data processor 205'', to compare circuit 204''. As discussed above the compare circuit functions to compare these two data signals for coincidence.

A third slow-rate data path 209 exists between compare circuit 204'' and data processor 205'', and specifically is the path for the signal terminating a test, either because of non-coincidence in the comparison function 204'' or because the test has been successfully completed.

IE. A MULTIPLE TRANSFER LOOP SYSTEM (FIG. 5)

Referring now to FIG. 5, there is shown a form of the invention capable of testing units which have large numbers of input and output terminals. With such units the number of input and output terminals frequently exceed the number of bits in the data processor output words. For example, in the structure of FIG. 1, it is assumed that the data processor outputs in serial manner 12-bit words, and that two of these words are assembled in the serial-to-parallel converter 102 and then supplied to the UUT in parallel form as a single 24-bit word. In the case of UUT's having more than 24 input terminals or 24 output terminals, it is necessary to employ additional logic to supply test data words to the UUT. Such additional logic is shown in FIG. 5 and essentially functions to perform a type of multiplexing.

More specifically in FIG. 5 there are shown four input registers 240, 241, 242, and 243 and four output registers 244, 245, 246, and 247 associated respectively with the input terminals and the output terminals of the UUT 100''. A group of AND-gates 258, 259, 260, and 261 connect the output of data processor 101'' to the four registers 240 through 243, respectively.

Each of the four output registers 244 through 247 has an AND gate at its input and an AND gate as its output terminal. The AND gates at the inputs of output registers 244–247 are designated by reference characters 248 through 251 and the AND gates at the output terminals thereof are designated by reference characters 252 through 255. The outputs of the four output AND-gates 252–255 are supplied to a common OR-gate 256 whose output is in turn supplied to transfer function 109'', the compare circuit 113'' and to the parallel-to-serial converter 111''', all through appropriate gating networks.

It is to be noted that each of the double-lined leads, such as lead 215, represents 24 individual conductors. The only exceptions in FIG. 5 are the double-lined leads 216, 296, and 193, each of which represents four individual conductors running from register 217, lead 334 and selector means 270 respectively, each of which will be discussed in detail later herein.

Also shown in FIG. 5 are two interface adapters 194 and 195 which interface the input and the output of the UUT 100'' with the test apparatus. The said interface adapters 194 and 195 function to accommodate the various impedance, voltage, and current requirements of different UUT's to the voltage and impedance characteristics of the testing apparatus. For example, MOS circuits require quite different voltage and impedance levels than do TTL type circuits or other semi-conductive type circuits. It is apparent that different interface adapters are required for almost every different type electronic device, since voltage and impedance levels, as well as the number of input and output terminals, are different for different electronic devices.

Furthermore, even with a given type UUT it is sometimes desirable, for test purposes, to be able to vary voltage levels to meet different specifications. Accordingly, the interface adapters 194 and 195 are constructed to contain variable voltage level sources.

Another parameter usually controlled during testing is temperature. While means for controlling temperature are not specifically shown in FIG. 5, the interface adapters 194 and 195 are herein defined including a temperature control environmental means, if needed.

Since the specific design for the interface adapters 194 and 195 does not form a part of this invention, such design will not be discussed in detail herein.

It is to be understood that the logic of FIG. 1 and FIG. 3 also include interface adapters at the input and output terminals of UUT 100, even though such adapters are not specifically shown in FIGS. 1 and 3.

IF1. INITIALIZATION MODE (FIG. 5)

In the operation of the circuit of FIG. 5, four 24-bit words are assembled sequentially in the serial-to-parallel converter, each in the same manner as discussed in connection with FIG. 1. These four 24-bit words are supplied sequentially to each of the registers 240 through 243 by means of sequentially opening gating circuits 258 through 261.

Worded in another way, when the first initializing data word is transmitted from converter 102'', a selecting means 270, which can be a counter under control of master logic 180', functions to enable AND-gate 258 so that the 24-bit word will pass into input register 240 in parallel form.

Before the next initialization data work is supplied from the serial-to-parallel converter 102'', the master control logic will cause selecting means 270 to disable AND-gate 258 and open AND-gate 259, thus causing the said next 24-bit initialization data word to pass into register 241.

In a similar manner the next initialization data words will pass successively into registers 242 and 243. Then each of the four registers 240 through 243 will contain a 24-bit initialization data word, which together form one 96-bit word. A UUT clock pulse, generated in source 114' (under control of master control logic 180' but not shown), will then be supplied to the UUT 100'' and will function to enter into the UUT the 96-bit word stored in the input four registers 240–243.

It should be noted specifically that in the particular embodiment of the invention described there is a hard connection between the outputs of the four registers 240–243 and the input terminals of the UUT 100'' so that as soon as a UUT clock pulse is supplied to UUT 100'', the said UUT 100'' will respond thereto to undergo whatever internal changes are dictated thereto by the supplied 96-bit data word.

The master control logic then causes the selecting means 270 to begin the cycle anew by opening AND-gate 258 so that the fifth initialization data word is supplied into register 240. Subsequently the sixth, seventh, and eighth initialization data words are supplied into registers 241, 242, and 243. Then the resulting 96-bit word stored in the four registers is clocked into the UUT 100'' by means of a UUT clock pulse from source 114'.

This aforementioned sequence of operation is continuous until initialization is completed. As discussed above, completion of initialization is indicated by an initialization counter not specifically shown in FIG. 5. When said counter goes to zero it marks the end of the initialization mode. The details of such logic will be discussed later in connection with FIG. 6.

After completion of initialization the UUT will have a particular data word appearing at its output terminals. Such data word is strobed into the four output registers 244–247 through strobe gates 248 through 251 respectively, and the system is then ready for the characterization mode of operation.

With certain types of electronic device it is desirable to maintain certain conditions within the test unit during characterization and testing. For example, it might be desirable to maintain a given flip-flop in the test unit in a given state throughout the test, or it might be desirable to maintain a counter at a given count throughout the test, or as a third possibility, it might be desirable to maintain certain voltage levels throughout the test.

To obtain any of the above-mentioned or other test conditions, there is provided in FIG. 5, logic including flip-flop 299, AND-gate 298, and an input register 217.

The operation of the above-mentioned logic is as follows. Flip-flop 299 is caused to be set during the entire initialization mode and is reset at the end of initialization when the initialization counter is decremented to zero. Thus AND-gate 298 is conductive only during initialization and during this period will pass certain predetermined bits of each 24-bit word supplied to input register 240. More specifically, the double-line input lead 296 to AND-gate 298 consists of four individual conductors which correspond and are electronically connected to the four leads representing bits 1 through 4 of the 24-bit words supplied via 24-lead cable 334. It is to be noted, however, that AND-gate 298 is opened only during those time intervals that AND-gate 258 is opened due to the common input lead connection 297. Furthermore, AND-gate 298 is opened only during initialization since flip-flop 299 is set only during initialization. Thus while the contents of storage register 217 will change during initialization each time a 24-bit word is supplied to register 240, the four bits supplied to register 217 on the last 24-bit initialization word supplied to register 240 will remain in register 217 during the entire characterization or testing mode of operation which follows.

The output means 216 of register 217 also consists of four leads which are, as indicated above, connected to certain desired points in the test unit.

The setting of flip-flop 299 at the beginning of the initialization mode preceding characterization can be done manually by an operator. On the other hand the setting of flip-flop 299 can be automatically effected at the end of characterization or testing by a signal derived directly from the sample counter when it decrements to zero.

IF2. CHARACTERIZATION MODE (FIG. 5)

The basic operation of the characterization mode is as follows. Under control of master logic circuit 180' the 24-bit word in output storage register 244 is circulated at a high rate of speed through its output AND-gate 252, OR-gate 256, AND-gate 161', transfer function 109'', AND-gate 258, input storage register 240, UUT 100'', strobe gate 248, and back then into output register 244.

After the aforementioned cycle has been completed, i.e., the circulation of the 24-bit word in storage register 244 completely around the transfer loop and back into the register 244, then the 24-bit data word in the next output register 245 is caused to circulate around a similar transfer loop and back into output register 245. More specifically the 24-bit word in output register 245 is caused to circulate, under control of the master control logic, through its output gate 253, OR-gate 256, AND-gate 161', transfer function 109'', AND-gate 259 input storage register 241, UUT 100'', strobe gate 249 and then back into storage register 245.

In a similar manner the 24-bit data word in output registers 246 and 247 will be circulated around the transfer loop, through input registers 242 and 243, respectively, the UUT 100'' and then back into output registers 246 and 247, respectively.

The cycle is then repeated in that the new 24-bit data word stored in output register 244 will next be circulated completely around the loop, followed by circulation of the new 24-bit data words in output registers 245, 246, and 247, in sequential manner.

Each time a 24-bit word is circulated from an output register completely around the transfer loop and then back into the output register constitutes a cycle of operation. Each time such a cycle of operation occurs the cycle counter discussed hereinbefore is incremented by one.

It is also to be noted that each time one of the 24-bit words is circulated completely around the loop, changes are imposed thereon both by the transfer function 109'' and also by the UUT 100'' as the data word passes therethrough.

Every nth cycle of the circulating data during characterization the master control logic will function to open AND-gate 158' and to supply sampled data through said AND-gate 158' to the parallel-to-serial converter 111'', and then to the data processor 101''. During characterization AND-gate 164' and compare function 113'' are disabled.

IF3. TESTING MODE (FIG. 5)

During the testing mode of operation the master control logic 180' will function to disable AND-gate 158' and to enable AND-gate 164' so that compare function 113'' is enabled.

Thus every Nth cycle of the circulating word around the transfer loop is supplied to compare function 113'', where it is compared with the corresponding data word from the truth table stored in suitable bulk storage, such as a magnetic tape, controlled by data processor 101'', as discussed above.

It is to be noted that the circulation of the data words through the transfer loop during the testing mode is identical to the circulation of the data word through the transfer loop during characterization. More specifically, during characterization the data word in each of the output registers 244 through 247 is completely circulated around the transfer loop and then back into its starting storage register before the data word in the next output register is circulated.

It is to be noted also, that, during initialization, only the input storage registers 240 through 243 and the associated input AND-gates 258 through 261 are utilized. The output registers 244 through 247 and their associated strobe gates 248–251 and output AND-gates 252–255 are not employed. However during both the characterization and testing modes of operation both the input registers 240–243 and the output registers 244–247, and their associated input and output strobe and AND gates are utilized.

As in the case of the logic circuit of FIG. 3 the switch 165' can be of a manual type which is preset by the operator so that the system, after the initialization mode of operation is completed, will selectively perform either the characterization or the testing mode of operation.

As discussed above in connection with FIG. 3, switch 165' can be electronic and automatically switched from the characterization mode to the testing mode at the end of characterization. The foregoing can be easily implemented by a flip-flop circuit (not shown) which is originally set to condition AND-gate 158' to become opened at sampling times. At the end of characterization, when the sample counter decrements to zero, the flip-flop circuit is reset and will remain reset through all subsequent testing mode operations.

In order to prevent the output of the data processor 101'' from being supplied to the initialization logic 154' during the testing mode, there is provided AND-gate 153'. The operator can manually set flip-flop 185 at the beginning of initialization through input terminal 225 and OR-gate 226 so that AND-gate 153' is conductive and will pass data words therethrough during initialization. However, when the initialization counter decrements to zero the flip-flop 185 is reset so that AND-gate 153' is disabled and prevents any further transfer of words therethrough. At the end of characterization and at the end of each testing mode, when the sample counter decrements to zero, the flip-flop 185 is set through input lead 227 and OR-gate 226.

II. DETAILED DESCRIPTION

A. INITIALIZATION MODE OF OPERATION (FIG. 6)

Referring now to FIG. 6, there is shown a more detailed diagram of the logic employed for initialization. It is to be understood that the logic set forth in FIG. 6 is only a preferred arrangement and that other arrangements can be utilized to perform the same functions.

In FIG. 6 the logic within dotted block 299 is a more detailed showing of block 154' of FIG. 5. Similarly the logic within block 102''' of FIG. 6 is an elaboration of the logic shown in block 102'' of FIG. 5.

In the serial-to-parallel converter 102''' there is provided a means 321 for detecting the transmission of two 12-bit words from the data processor 101''''. These two 12-bit words are serially received in 24-bit shift register 322, and upon completion of such reception the resultant 24-bit word is transferred in parallel to 24-bit output buffer storage register 323. Next the 24-bit word is transmitted to the initialization logic through AND-gate 153'' which is opened by a gating pulse on lead 340 from word detecting means 321. It is to be noted specifically that the logic is designed so that the gating pulse on lead 340 occurs only after the reception of two 12-bit words and only after the transfer of said two 12-bit words to the 24-bit output buffer register 323.

The 24-bit words are supplied through AND-gate 153'' to several destinations where they are utilized in accordance with coding contained therein. Specifically each 24-bit word is supplied to the Identify Start Instruction block 301, and AND-gates 305, 306, and 307, AND-gates 258' through 261' and the AND-gate 298'.

Each of the first several instruction words during the initialization period performs a specific function as follows. The Identify Start Instruction block 301 is constructed to respond to the first instruction word in the initialization mode to recognize that the initialization mode is beginning. The Identify Start Instruction block 301 will thereupon supply a signal through OR-gate 302 to counter 303.

The counter 303 counts from 0 to 4 and at the beginning of the initialization mode has a count of 0. The pulse supplied thereto from the Identify Start Instruction logic 301 functions to increment the count in the counter 303 from 0 to 1 and thereupon condition AND-gate 305 to transmit the next instruction word therethrough to the initialization counter, represented generally by block 308.

The said next instruction word will then pass through AND-gate 305 and will set the initialization counter 308 to a number predetermined by the programmer and identifying the number of steps in the initialization program.

Upon being set, the initialization counter 308 will supply an output pulse via lead 341 through OR-gate 302 to counter 303, thereby incrementing said counter 303 from a count of 1 to a count of 2. When containing a count of 2 the counter 303 will function to condition AND-gate 306 to pass the third instruction word through AND-gate 306 to set the cycle counter 309 to zero.

Upon being set to zero the cycle counter 309 logic will function to supply a pulse via lead 342 and through OR-gate 302 to increment counter 303 from a count of 2 to a count of 3.

When in a count of 3 the counter 303 will condition AND-gate 307 to pass the fourth instruction word through AND-gate 307 to set the sample counter 310 to the number of samples desired during either the characterization or the testing mode of operation. Upon being set to such number the said sample counter 310 will supply an output pulse via lead 343 through the OR-gate 302 to the counter 303, thereby incrementing said counter 303 to a count of 4.

When containing a count of 4, the counter 303 will function to reset the gate selector counter 270' to 0 and will also condition the UUT clock pulse AND-gate 317 to pass a UUT clock pulse when such UUT clock pulse occurs.

It is to be noted that the counter 303 will contain a count of 4 throughout the entire testing operation Counter 303 also contains a count of 4 after initialization during the entire characterization mode.

At this point in the initialization mode of operation the various instructions have been supplied to the test equipment to set the initialization counter to the desired count, to set the cycle counter to zero, and to set the sample counter to the desired number of samples to be taken during a characterization or testing.

At the same time the cycle counter is set to zero, the termination count of the cycle counter is set. A termination setting of the cycle counter is required since each complete cycling thereof is employed to determine the time at which a sample is taken of the recirculating data.

It should also be noted that at this point in the initialization mode of operation the gate selector counter 270' has been reset to zero so that AND-gate 258' is conditioned to pass the first initialization data word supplied from the data processor.

After the series of instruction words listed above have been supplied to the equipment, the first initialization data word will occur and is supplied from the serial-to-parallel converter 102''' through AND-gate 153'' to the inputs of the four AND-gates 258' through 261'.

However, at this time only AND-gate 258' is conditioned to pass a 24-bit data word therethrough since the counter 270' contains a count of 0. Thus the first 24-bit data word will pass through AND-gate 258' into register No. 1.

Before the next data word occurs, it is necessary to increment the selector counter 270' by a count of 1 so that AND-gate 259' can be conditioned to pass said next data word into register No. 2. Such incrementing of counter 270' can be accomplished by the same gating pulse which is supplied to AND-gate 258' to gate the first data word into register No. 1. More specifically, such gating pulse is supplied to variable pulse delay means 314 which will delay said gating pulse by a predetermined interval of time (for generation of the UUT clock pulse as will be discussed later). The said delayed pulse is then delayed a second time by delay means 315 and subsequently is passed through INHIBIT AND-gate 325, which is conductive only during the initialization mode, and then through OR-gate 329 into counter 270' to increment said counter from a count of 0 to a count of 1. It should be noted that INHIBIT AND-gate 325 is inhibited by its input lead 327 when the initialization counter contains a zero. The time length of delay means 314 and 315 is of such a magnitude that the counter 270' will be incremented in-between the reception of the first and second data words so that the second received data word occurs after incrementing of counter 270'. When containing a count of 1 the counter 270' will have an output signal on its output lead 361 to condition AND-gate 259' to pass said next received (the second) data word therethrough and into register No. 2.

In a similar manner the counter 270' is incremented from a count of 1 to a count of 2 and then to a count of 3 to pass the third and fourth received 24-bit data words through AND-gates 260' and 261', respectively, into input registers No. 3 and No. 4, respectively.

Reference is made to FIG. 7 which shows the timing waveforms for accomplishing the foregoing transfer of data words. In FIG. 7 the waveform A shows the general relationship between the initialization mode and the characterization and testing modes. It can be seen that initialization modes 340 and 342 precede both the characterization and the testing modes identified by reference characters 341 and 343. The waveform B shows the condition of AND-gate 153' of FIG. 5 and illustrates that it is opened only during the initialization mode. The gating pulses from word detecting means 321 of FIG. 6 are represented by pulses 350–353 and pulses 358–361 of waveforms C through F. It is to be noted that the two initialization data words 344 and 345 of waveform B are shown in expanded form in waveforms C through J.

The delayed incrementing pulses supplied to selector means 270 of FIG. 5 are shown in waveform G and designated by reference characters 354–357 and 362–365. These incrementing pulses can be seen to occur between the data word gating pulses, such as pulses 350 through 353, for example.

The data words from data processor 101'' are supplied through AND-gates 258–261 into input registers 240–243 at times $t_1$, $t_2$, $t_3$, and $t_4$, respectively. A UUT clock pulse 380, shown in waveform H, then clocks the contents of the four registers 240–243 simultaneously into UUT 100''. It is to be noted that clock pulse 380 occurs after gating pulse 353 of waveform F but before the counter clock pulse 357 of waveform G. The foregoing timing relation between UUT clock pulse 380 and counter clock pulse 357 is primarily a precaution to prevent a change in the contents of register 240 (FIG. 5) before the 96-bit word contained in the four input registers is clocked into the UUT.

Beginning immediately at time $t_5$, the cycle is repeated for the next data word 345 of waveform B. Said next cycle employs data word gating pulses 358–361 of waveforms C, D, E, and F, and the four counter clock pulses 362–365 of waveform G. The data is entered into input registers 240–243 at times $t_6$, $t_7$, $t_8$, and $t_9$, followed by the UUT timing pulse 381 as shown in waveform H.

A typical initialization data word preceding the testing mode is shown on the right-hand side of FIG. 7. The gate timing pulses 366 through 369 function to successively supply four 24-bit words into the four input registers 240–243, which are successively selected by the counter clock pulses 370–373 of waveform G. The entry of the 24-bit words into the input registers occurs at times $t_{12}$, $t_{13}$, $t_{14}$, and $t_{15}$, respectively, with the resulting 96-bit word being clocked into the UUT BY UUT clock pulse 382.

Waveform J shows the pulses employed to decrement the initialization counter. The data word 348 of waveform B represents the last data word in the initialization mode. Thus pulse 385 of waveform J functions to decrement the initialization counter to its zero count.

Referring now to FIG. 6, it is to be specifically noted that only after all four input registers No. 1 through No. 4 have been supplied with a 24-bit word that a UUT clock pulse is supplied through AND-gate 317 and into the unit under test. The logic for delaying the UUT clock pulse until after all four registers have been supplied with their 24-bit words can be seen by examining the inputs to AND-gate 317. The first input 320 is connected to the count of 3 output, C3 of counter 270' so that AND-gate 317 can have an output only after all four input registers Nos. 1–4 have been supplied with their 24-bit words. Input 319 to AND-gate 317 is connected to the count 4 stage of counter 303 so that a UUT clock pulse can occur only after all of the initialization instruction words have been received by the initialization logic and the data words are ready to be received.

The input lead 316 to AND-gate 317 determines the specific time that the UUT clock pulse is supplied to the UUT, subject to the above limitations. It can be seen that the pulse supplied via input lead 316 is determined by the variable pulse delay means 314, which can be varied to cause a UUT pulse to occur at a desired interval of time after the four input registers have received their 24-bit data words from the data processor.

It is to be specifically noted that variable pulse delay means 314 can be a fixed pulse delay means since the important consideration is that the UUT pulse occur after the four input registers have been filled, but before the counter 270' is incremented to its next count, which would cause the first register 258' to become conductive for a second time during the reception of one 96-bit word. The cycle of operation described above continues in that the four input registers 258' through 261' are each again filled with a 24-bit word to form a resultant 96-bit word, which is then strobed into the UUT by means of a UUT clock pulse supplied to AND-gate 317.

Each time one of these cycles occurs the initialization counter 308 is decremented by 1 with decrementation occurring by the supplying of the UUT clock pulse thereto through input lead 311.

As described above the initialization counter was originally set at the beginning of the initialization to a number equal to the number of cycles in the initialization mode. When the initialization counter 308 is decremented down to a count of zero an output pulse will appear on lead 312 which will signal the end of the initialization mode of operation and will initiate either the characterization or testing mode of operation in a manner described in the following sections.

Before discussing a more detailed description of the characterization and testing modes, reference is again made to FIG. 5 to show more specifically how the count of zero in the initialization counter 308 of FIG. 6 will function to terminate the initialization mode of operation.

In FIG. 5 the lead 197 corresponds to the lead 312 of FIG. 6. When the initialization counter decrements to zero a signal is supplied therefrom to reset flip-flop 185 in FIG. 5, thereby disabling AND gate 153' so that no further words can be supplied from the serial-to-parallel converter 102' into the initialization logic 154'.

Furthermore, zero count indication of the initialization counter is supplied to AND-gate 325 (FIG. 6) via lead 327 to disable said AND-gate 325 to prevent the supplying of any further pulses from pulse delay means 315 to selector counter 270'. Said counter 270' will continue to function during the characterization and testing modes but in a different manner as will be described below.

IIB. CHARACTERIZATION MODE OF OPERATION

Immediately upon termination of the initialization mode of operation several changes occur in the system. These changes include changes in timing and a different arrangement of the logic modules of the system.

The basic timing changes involve the circulation of the data through the UUT, the transfer function, and through the banks of AND gates associated with input registers 240–243 and output registers 244–247 of FIG. 5.

The function of the selecting means 270 must also change in that it must cause the circulating data to circulate through successive paths around the transfer loop each succeeding cycle. More specifically, on the first cycle the data will circulate through a path starting from output register 244 and including output AND-gate 252, transfer function 109'', AND-gate 258, register 240, UUT 100'', strobe gate 248 and then back into output register 244.

At this point the selecting means 270 must function to enable AND-gate 259, strobe gate 249 and AND-gate 253 so that the next circulation of data around the transfer loop will include the second input register 241 and the second output register 245.

Such timing means are shown in more detail in FIG. 8 which will be discussed shortly. First, however, the basic changes in arrangement of logic will be pointed out.

Means must be provided to switch the selector counting means 270' from the logic of FIG. 6 which controls it during initialization, to the logic of FIG. 8 which controls it during characterization and testing. Such switching logic is shown in FIG. 6 and comprises flip-flop 428', AND-gate 331, OR-gate 329, AND-gate 325 and their various inputs.

As has been discussed before, AND-gate 325 is energized during the initialization mode and functions to supply the incrementing pulses to selector means 270' during such mode. Also during initialization, the AND-gate 331 is disabled by virtue of the fact that it is enabled only when the initialization counter equals zero (IC=0).

At the end of initialization, the initialization counter goes to zero and AND-gate 331 is conditioned to be opened when flip-flop 428' is set. Flip-flop 428' corresponds to flip-flop 428 of FIG. 8 which figure will be described later herein. It will be sufficient at this point to state that flip-flop 428 of FIG. 8 is set and then reset a short time thereafter to produce an incrementing pulse for selector counter 270' once after each circulation of a data word around the transfer loop.

During characterization the master control logic 180' (FIG. 5) will function to enable AND-gates 161' and 158', but will disable AND-gate 164' since the compare function 113'' is not utilized during characterization.

Furthermore, when the initialization counter decrements to zero a signal will be supplied via lead 197 in FIG. 5 to set flip-flop 185, thus disabling AND-gate 153' and preventing any further data words from being supplied into the system from data processor 101''.

The timing means shown in FIG. 8 is actually included in the master control logic 180' of FIG. 5 and functions to provide a versatile and variable means for circulating the data around the transfer loop at variable rates of speed, as will be seen from the following detailed description of FIG. 8.

In FIG. 8 the basic timing source is a variable rate clock pulse source 400 which can function to operate over a desired range of frequencies extending from a few kilohertz to several megahertz, or higher if needed.

During characterization a pulse is supplied to the input lead 417 of OR-gate 414 which will thereby produce a pulse on input lead 425 of AND-gate 401 to condition AND-gate 401 to be enabled when one other condition is met. Such other condition is the supplying of a signal of proper polarity to input lead 426. It is to be noted that the signal supplied to input 426 of AND-gate 401 can be provided initially by manually operated means. Thereafter automatic means can easily be provided. Specifically the signal for input lead 426 can be derived from the set output of flip-flop 185 of FIG. 5.

During characterization, AND-gate 401 is opened continuously by virtue of a signal supplied to input lead 417 of OR-gate 414. During testing, however, AND-gate 401 can be closed occasionally to interrupt the circulation of data around the transfer loop. Such interruption feature will be discussed in the following paragraphs.

When input signals are present on both leads 426 and 425, the output of variable clock pulse source 400 will pass through AND-gate 401 and into a shift register means 402, which can have an operating speed and a size suitable for the type testing to be performed. In the particular embodiment shown in FIG. 8, shift register 402 is represented as having 100 stages with a binary '1' being originally placed only in the first stage of the shift register at the beginning of operation. All of the remaining stages of the shift register contain '0's.' Thus as the pulses from variable rate clock pulse source 400 are supplied to shift register 402 such pulses will function to shift the binary '1' through the 100 stages of the shift register at the output pulse rate of clock pulse source 400. The shift register 402 is also constructed so that the 100th stage is connected back into the first stage, thus forming a circulating path for the binary '1' being shifted therethrough.

Each of the 100 stages of shift register 402 has a separate output associated therewith and designated by reference characters S–1 through S–100 with S–1 representing the first stage of the shift register and S–100 representing the 100th stage.

Thus as the binary '1' circulates from stage to stage through the shift register it will provide a signal at the output S–1 through S–100 in a successive manner.

Selected ones of these outputs S–10 through S–100 are connected to the set and reset inputs of five flip-flop circuits identified by reference characters 403, 404, 405, 406, and 428. These flip-flop circuits in turn control the operation of the three banks of AND-gates 407, 408, and 409, the UUT clock pulse source 114' of FIG. 5, and also functions to control the incrementing of the selector means 270'' of FIG. 8 which corresponds to the selector means 270 of FIG. 5.

More specifically, the flip-flop 403 functions to simultaneously condition the four AND-gates 252' to 255' appearing at the output registers 244 through 247 of FIG. 5. The flip-flop 404 in FIG. 8 functions to simultaneously condition the four AND-gates 258'' through 261'' which appear at the input of the four input registers 240 through 243 of FIG. 5. The third flip-flop 406 functions to condition for enablement the four strobe gates 248' through 251' which appear at the inputs of the four output registers 244 through 247 of FIG. 5.

The flip-flop 428 functions to control the incrementing of the selector counter means 270''. It is to be noted that selector means 270'' changes count only during the characterization and testing modes, and that such changes of count occurs only after the complete cycle of a data word through the transfer function. As will be recalled from prior discussion, during initialization the selector means 270'' functions to sequentially enable only AND-gates 258 through 261 of FIG. 5. However, during characterization and testing modes it is necessary to enable strobe gates 248 through 251 and AND-gates 252 through 255, as well as the AND-gates 258 through 261, each in a sequential manner. To facilitate such enabling of all three groups of AND and strobe gates there is provided an input lead 430 in FIG. 8, upon which there is impressed a signal at the beginning of characterization and testing and which will exist all throughout such modes of operation. This signal on input lead 430 (lead 193 in FIG. 5) is supplied to each of the two groups of AND-gates 248–251 and 252–255 as shown in FIG. 5. Thus during characterization and testing the output of selector means 270" of FIG. 8 will open all of the AND-gates (252-255, 258-261, and 248-251) which have been conditioned to be opened by the outputs of flip-flops 403, 404, or 406 of FIG. 8.

Consider a specific example of the foregoing. When the first data word is to be circulated through the transfer loop, the selector means 270" will have an output on its zero count output lead 418 which will be supplied to AND-gates 252', 258", and 248' in FIG. 8. Thus, as flip-flop 403 is caused to be set and reset by the successive output pulses appearing on output terminal S-10 and S-30 of shift register 402, AND-gate 252' will become enabled and then disabled. Flip-flop 404 is also set and reset by output signals on output terminals S-10 and S-30 of shift register 402. Thus AND-gate 258" will be enabled and disabled simultaneously with AND-gate 252'.

A short interval of time later, as the binary '1' is propagated through stages S-70 in shift register 402, the flip-flop 406 will be set. Such setting of flip-flop 406 will cause AND-gate 248' to be enabled. Then as the binary '1' in shift register 402 reaches the stage S-80 thereof, flip-flop 406 is reset, thereby disabling AND-gate 248'.

It should be noted that before flip-flop 406 is set and reset the flip-flop 405 will be set and reset by pulses from terminals S-40 and S-60 of shift register 402. The output of flip-flop 405 constitutes the UUT clock pulse and is equivalent to the block 114' of FIG. 5. Such UUT clock pulse is supplied to the UUT 100" of FIG. 5 to cause changes therein in response to the 24-bit word supplied from one of the registers 240-243.

Thus it can be seen that as the binary '1' in shift register 402 propagated from the first stage to the 80th stage thereof, the data has been transferred, in FIG. 5, from output storage register 244 through AND-gate 252, transfer function 109", AND-gate 258, input register 240, UUT 100", the strobe gate 248 and then back into output register 244.

At this time it is necessary to increment selector means 270" in preparation for the next cycle. Such incrementation is accomplished by means of flip-flop 428. More specifically, when the output terminal S-85 of shift register 402 is activated, flip-flop 428 is set and is reset 10 clock pulses later when terminal S-95 is activated. The pulse appearing at the set output of flip-flop 428 is passed through OR-gate 411 to selector means 270" to cause incrementation thereof from a count of zero to a count of 1.

In a similar manner the data words stored in the second output storage register 245 of FIG. 5 is circulated around the transfer loop and then stored back into the storage register 245.

Subsequently the third and fourth data words, stored in output registers 246 and 247, respectively, are circulated with the selector means 270" being incremented by a count of 1 after each cycle. When the selector means reaches a count of 3 it will, on the next incrementation, recycle to a count of zero and the whole process will begin anew.

The AND-gate 325' in FIG. 8 is a duplication of AND-gate 325 of FIG. 6 and merely illustrates that during the initialization mode AND-gate 325' is enabled to provide the counting means for selector means 270", as discussed in connection with FIG. 6.

IIC. TESTING MODE OF OPERATION (FIGS. 5, 6, 7, 8)

Although in the characterization mode the circulation of data through the transfer loop can be uninterrupted, it is necessary to provide means for interrupting the circulation of such data during the testing mode. Such interruption during testing is required since a comparison of the circulating data and the corresponding data word from the truth table in the data processor is made during testing, and the two data words do not always arrive at the compare function simultaneously. As discussed above it is quite possible, due to internal housekeeping within the data processor or for other reasons, that the words from the data processor will not have been supplied to the comparison circuit at the same time, or prior to, the supplying of the sampled word from the circulating data. In such cases it is necessary to interrupt the circulation of the data word through the transfer loop until the corresponding data word from the data processor is supplied to the compare function, such as the compare function 113" of FIG. 5.

The logic means for interrupting the circulation of the data in the transfer loop includes AND-gate 433, flip-flop 413, OR-gate 414, and AND-gate 401 of FIG. 8. More specifically, if a word ready signal from logic 321 of FIG. 6 is not present on inhibit input 436 of AND-gate 433, the sample signal, which is supplied to lead 435 of AND-gate 433, will condition said AND gate to pass the S-100 output pulse of shift register 402 when it occurs, thus producing an output from AND-gate 433 which will set flip-flop 413 and disable AND-gate 401. Consequently, there will be no output from OR-gate 414.

Disabling of AND-gate 401 will cut off the supply of clock pulses from clock pulse source 400 to shift register 402 and will, in effect, interrupt the transfer of data around the transfer loop.

The sample word will, however, have been placed in the compare function 113" of FIG. 5, i.e., will have been placed in a 24-bit shift register in the compare function 113" (FIG. 5) where it will wait until the 24-bit word from the data processor is supplied to a second shift register in the compare function 113". When the 24-bit word from the data processor is ready to be supplied to compare function 113", there will occur a gating pulse from the serial-to-parallel converter 102" of FIG. 5 indicating that such word is being transmitted to the compare function 113". Such gating pulse functions to set flip-flop 440 in FIG. 8, which in turn disables AND-gate 433 by resetting flip-flop 413, thus enabling AND-gate 401 and permitting a resumption of the circulation of data through the transfer function.

When the comparison is completed in compare function 113" of FIG. 5, a signal is supplied to reset flip-flop 440 and place the logic condition for the occurrence of the next comparison.

Referring now to FIG. 9 there is shown a more detailed logic diagram of one form of a compare function that can be employed within the block 113" of FIG. 5.

In FIG. 9 the 24-bit data word circulating in the transfer loop is supplied to a register 452. The 24-bit data word from the truth table in the data processor is supplied to a second register 450. It is only when both the registers 452 and 450 contain a 24-bit word that a comparison of the two words is made in the compare logic 451.

The determination of the presence of 24-bit words in both registers 452 and 450 is accomplished by means of OR-gates 453 and 454, both having their output connected to AND-gate 455. It is only when at least one binary bit '1' is present in each of the two data words supplied to registers 452 and 450 that AND-gate 455 will function to supply an output to compare logic 451 to effect comparison of the two data words.

If coincidence occurs an output signal appears on lead 456. This output signal on lead 456 functions to clear the two registers 452 and 450 in preparation for the next comparison and also resets flip-flop 440 of FIG. 8. Resetting of flip-flop 440 prepares the logic of FIG. 8 for the next sampling function.

Referring now to FIGS. 10 and 10A, there are shown waveforms of the timing signals employed in the characterization and testing modes of operation. Two cycles of operation are shown for both the characterization and the testing modes.

In FIG. 10 the waveforms A, B, and C show the operation of gates 161, 158, and 164 in the characterization mode. Waveform D of FIG. 10 simply shows the relation of the initialization mode to the characterization and testing modes of operation. The timing involved in two cycles of characterization of operation, 490 and 491, are expanded in waveforms E through Q of FIG. 10. Similarly, during the testing mode the timing during two cycles of operation 492 and 493 are expanded in the following waveforms E through Q of FIG. 10A.

As shown in waveforms E and F, the AND-gates 252 and 258 of FIG. 5 are caused to be conductive for a short interval of time beginning at time $t_1$ under control of the output of flip-flops 403 and 404 of FIG. 8. The 24-bit word contained in output register 244 of FIG. 5 is thereby transferred through the transfer function 109" of FIG. 5 and into input register 240, as indicated in waveform G of FIG. 10.

Subsequently a UUT clock pulse occurs, as shown in waveform H, and under control of the output of flip-flop 405 of FIG. 8. Subsequently the strobe gate 248 of FIG. 5 is caused to be opened by the output of flip-flop 406 of FIG. 8, as shown in waveform I of FIG. 10, thus entering the 24-bit word stored in input register 240 into UUT 100" of FIG. 5.

Next the selector means 270" of FIG. 8 is caused to be incremented by an output pulse from flip-flop 428, thus preparing the system for the next cycle of operation which occurs between $t_5$ and $t_9$ of FIG. 10.

The cycling of the data words during the testing mode is much the same as the cycling during characterization. Examples of two consecutive cyclings of the data word during the testing mode are shown between times $t_{10}$ and $t_{19}$ of FIG. 10A.

In the testing mode, however, as discussed in a preceding section, it is possible to interrupt the circulation of the data word around the transfer loop in the event that the data word from the truth table in the data processor has not been supplied to the compare circuit at the time the sampled data word is supplied thereto.

Assume that cycle 492 of waveform D of FIG. 10A represents the particular cycle at which a sample is to take place. Further assume that the data word from the truth table is not present in the compare circuit. Under such conditions the data circulating through the transfer loop will be interrupted at time $t_{15}$, and represented by the vertical dotted line 499 in FIG. 10A, which time corresponds to the pulse appearing on the output terminal S-100 of the shift register 402 of FIG. 8.

Interruption of circulation of the data through the transfer function will continue until the data word from the truth table is supplied to the compare function and comparison is completed as discussed in connection with FIGS. 8 and 9. After such comparison has been made circulation of the data through the transfer loop will resume and the next cycle, identified by reference character 493, in waveform D of FIG. 10A will commence.

IID. TRANSFER FUNCTION

A more detailed logic diagram of the transfer function 109" of FIG. 5 is shown in FIG. 13, and includes a bank of 24 OR-gates 500, a 24-stage shift register 501, and an OR-gate means 502. Said shift register 501 and the OR-gate means 502 function generally as a 24-bit word pseudo-random signal generator, with the 24 bits of each generated word being OR'd on a one-for-one basis with the corresponding 24 bits of the circulating data word in the bank of OR-gates 500.

Before discussing the operation of the logic diagram of FIG. 13, the logic of FIG. 11 will be described. In FIG. 11 there is shown a pseudo-random generator of the type employed in FIG. 13 and comprising a 24-stage shift register 501' and a feedback circuit including OR-gate 502'. While any combination of stages of shift register 501' can be connected to the inputs of OR-gate 502' in FIG. 11, the outputs from stages No. 1, No. 2, No. 3, and No. 8 have been selected and are connected to OR-gate 502'. The output of OR-gate 502' is fed back to the 24th stage of shift register 501'. As the contents of the shift register 501' are shifted to the left in FIG. 11, the contents of the 24th stage will be constantly replenished by the output of OR-gate 502'.

The OR-gate 502' actually represents an arrangement of three exclusive OR-gates 506, 507, and 508, arranged as shown within the block 502" of FIG. 12. It can be seen that the four input leads 510' through 513' of OR-gates 506 and 507 are equivalent to the four input leads 510 through 513 of OR-gate 502' of FIG. 11.

With only the logic arrangement of FIG. 11 there would be produced in shift register 501' all of the possible permutations of 24-bit words, with the exception of an all-zero 24-bit word. These permutations of 24-bit words will not, however, occur in sequential order. They will occur in what is herein defined as a pseudo-random manner determined by those stages of shift register 501' to which the four inputs of OR-gate 502' are connected.

After generating a pseudo-random sequence of all possible combinations of 24-bit words, the logic shown in FIG. 11 would begin the cycle anew and generate precisely the same sequence of combinations of 24-bit words.

Because the logic circuit of FIG. 11 will repeat the same sequence of 24-bit words, there is a statistical possibility of an erroneous data word occurring in the circulating data loop after a given sample, and then said defect, in effect, "curing" itself before the occurrence of the next sampling of the circulating data word. After such a "curing," the effect of the transfer function upon said circulating data word would be identical as if no error had occurred, and the next sample would be a correct sample. The UUT would appear to be good although it was in fact bad.

In order to prevent the foregoing there is provided a transfer function as shown in FIG. 13, wherein the 24-bit word in shift register 501 of the pseudo-random generator is not only changed due to the effect of the feedback circuit including OR-gate circuit 502, but is also changed each cycle by the data word circulating therethrough.

More specifically the circulating data word is supplied to the bank of 24 exclusive-OR-circuits 500, with one bit of said 24-bit circulating word being supplied to one, unique exclusive-OR circuit of the bank of 24. Also supplied to said bank of 24 exclusive-OR-circuits 500 are the 24 stages of the shift register 501, with the output of each stage of said shift register being supplied to one, unique exclusive-OR circuit.

The connections between the stages of the shift register 501 and the 24 OR gates are as follows. The output of the 24 exclusive-OR-circuits 500 are each individually connected to one of the parallel inputs of shift register 501. It is to be noted, however, that the connection from any stage of the shift register 501 is to an exclusive-OR circuit whose output is connected to the next immediate lower stage of shift register 501. Thus, for example, the output leads of 517 of stage No. 3 of shift register 501 is connected through lead 518 to the exclusive-OR-circuit $X_2$, whose output terminal 519 in turn is connected to the input of the stage No. 2 of shift register 501. Thus when that bit of the circulating data word appearing on input lead 520 is clocked into exclusive-OR-gate $X_2$, an output will be supplied from said exclusive-OR gate to the stage No. 2 of shift register 501. Thus in effect the bit contained in stage No. 3 of shift register 501 has been OR'd, with the incoming bit on lead 520, in exclusive-OR-gate $X_2$ and then supplied back into the stage No. 2 of shift register 501 via lead 519. Such operation in effect functions to shift the information in the shift register 501 one stage to the left in FIG. 13.

In a similar manner the data stored in each of the other stages of shift register 501, with the exception of stage No. 1, are OR'd through one of the exclusive-OR-gates 500 with one of the bits of the incoming circulating data word and is then supplied back into the next lower stage of shift register 501. As discussed above, the new bits supplied to stage No. 24 of shift register 501 are derived from the output of OR-gate 502, which is OR'd in exclusive-OR-circuit $X_{24}$ with a bit from the circulating data word. The output of exclusive-OR-circuit $X_{24}$ is supplied via lead 521 to stage No. 24 of shift register 501.

It is apparent from the foregoing that the contents of shift register 501 are not only altered by the function of OR-gate 500 but are also altered by the incoming 24-bit data word circulating in the transfer loop. Thus if an erroneous data word should occur it will alter the pattern of pseudo-random sequence of the 24-bit data word generated in shift register 501 in a repeatable manner for each test of a good unit.

The 24-bit data word output from the transfer function appears on the output terminals of the bank of exclusive-OR-gates 500. Such output data word is re-entered into the transfer loop and recirculation thereof continues.

Thus far in the disclosure, the transfer function 109 has been discussed such that there may have been an implication that the transfer must be other than unity. The reason for utilizing a transfer function 109 other than unity is to increase the length of the sequence of words which would be circulated before the sequence is repeated. It is desirable to have a sufficiently long sequence in order that the unit under test will receive all of the input values which are to be expected in service. A certain class of units to be tested have sufficiently complex internal logic to provide such a sequence length when the transfer function 109 is unity.

While a universal test machine would normally contain the more complicated version of the transfer function as shown in FIG. 13, specialized or low-cost testing devices could readily be implemented without the transfer function circuitry and still provide completely adequate test results since the output of the unit under test in these cases would be of a known repeatable type with respect to the input over the unit test period.

It is to be understood that the specific arrangements of logic means or combination of logic means forming the invention shown and described herein are, in many cases, but one of several possible arrangements. It is apparent that other forms of most of such subcombinations of logic can be employed without departing from the spirit or scope of the invention. For example, the use of a shift register with its output connected to its input, and with a single binary bit circulating therein to form the basis of a timing means is only one of several timing means which can be employed. Alternatively an arrangement of delayed lines could readily be designed by one skilled in the art to provide the necessary sequence of timing pulses for circulating a data word around the transfer loop. The essence of the invention lies in the overall combination of these various subcombinations of logic and in the method of testing.

I claim:

1. A method of testing electronic devices comprising the steps of:
   initializing a known good electronic device of the type to be tested by supplying a first predetermined sequence of data words to said known good electronic device to place said known good device in a predetermined condition;
   circulating a second sequence of data words, starting with a given data word, around a loop comprising said known good unit and a transfer function;
   altering said circulating data words by said transfer function to provide a sequence of repeatable alterations on said circulating data word for all electronic devices which respond in the same manner to data words circulating therethrough;
   sampling said data word every Nth circulation thereof;
   storing said sampled data words;
   initializing an electronic device to be tested to have the same predetermined condition as said known good device after initialization;
   circulating a third sequence of data words, starting with said given data word, around said loop comprising said electronic device being tested and said transfer function;
   sampling said third sequence of circulating data every Mth circulation thereof;
   and comparing said Mth sampled circulating data word of said third sequence of circulating data words with the Nth sampled stored data of said second sequence of circulating data words to determine coincidence or non-coincidence of said data words being compared, where M represents time-corresponding successive samplings.

2. The method of testing electronic devices with testing equipment comprising the steps of:
   initializing a known good unit to a predetermined condition;
   characterizing said known good unit;
   initializing a unit under test to said predetermined condition;
   testing said unit under test;
   said initializing steps each comprising the steps of;
   supplying a predetermined sequence of instruction words to the testing equipment to prepare said testing equipment for characterization or testing; and
   supplying a predetermined sequence of data words to the unit under test to place said unit under test in said predetermined condition;
   said characterizing step and said testing step each comprising the steps of;
   circulating a predetermined data word around a loop comprising the unit under test and a transfer function; and
   altering the data words as they pass through said transfer function in a repeatable manner in response to any given sequence of data words supplied thereto; and
   comparing at least one of the resulting data words in said characterizing step with the corresponding data words in the testing step.

3. A method of testing electronic devices comprising the steps of:
   initializing a known good electronic device of the type to be tested to place said known good device in a predetermined condition;
   circulating a first sequence of data words, starting with a given data word from the output means of the known good electronic device, through a data word transfer function having a given initial condition, and back to the input means of the known good electronic device;
   mutually altering the circulating data word and the transfer function by each other each circulation of the data word through the transfer function to produce at the output of said transfer function a sequence of repeatable data words for all electronic devices which respond in the same manner to data words circulating therethrough;
   sampling said first sequence of circulating data words in predetermined counts of circulations thereof;
   storing said sampled data words;
   initializing an electronic device to be tested to have the same predetermined condition as said known good device after initialization;
   circulating a second sequence of data words, starting with said given data word, from the output means of said electronic device being tested, through said transfer function having said initial given condition, and back to the input means of said electronic device being tested;
   sampling said second sequence of circulating data words for the same predetermined counts of circulation thereof as for the first sequence of sampling;
   and comparing said sampled data words of said second sequence of circulating data words with the corresponding sampled stored data words of said first sequence of circulations of data words to determine coincidence or non-coincidence of said data words being compared.

4. A method of testing electronic devices comprising the steps of;
   initializing a known good electronic device of the type to be tested to place said known good device in a predetermined condition;
   circulating a first sequence of data words, starting with a given data word, around a loop comprising said known good unit and a transfer function;
   mutually altering the circulating data word and the transfer function by each other each circulation of the data word through the transfer function to produce at the output of said transfer function a sequence of data words which is repeatable for all electronic devices which respond in the same manner to data words circulating therethrough;
   sampling every Nth circulation of said circulating data word;
   storing said sampled data words;
   initializing an electronic device to be tested to have the same predetermined condition as said known good device after initialization;
   circulating a second sequence of data words, starting with said given data word, around said loop comprising said electronic device being tested and said transfer function;

sampling said second sequence of circulating data every Mth circulation thereof;

and comparing said Mth sampled data word of said second sequence of circulating data words with the Nth sampled stored data word of said first sequence of circulating data words to determine coincidence or non-coincidence of said data words being compared.

5. A method of testing electronic devices comprising the steps of:

initializing a known good electronic device of the type to be tested by supplying a first predetermined sequence of data words to said known good electronic device to place said known good device in a predetermined condition;

circulating a second sequence of data words, starting with a given data word, around a loop starting from the output of the known good unit and ending at the input thereof;

sampling said data word in a predetermined sequence of circulations of the data words;

storing the sampled data words;

initializing an electronic device to be tested to have the same predetermined condition as said known good device after initialization;

circulating a third sequence of data words, starting with said given data word, around said loop comprising said electronic device being tested;

sampling said third sequence of circulating data words in the same predetermined sequence of circulations as the known good unit was sampled; and comparing the corresponding sampled circulating data words of the third sequence of circulating data words with the sampled stored data of said second sequence of said circulated data words to determine the identity of said data words being compared.

6. A method for testing electronic devices comprising the steps of:

initializing a known good electronic device of the type to be tested to a predetermined condition;

characterizing said known good unit to produce a sequence of data words of which every Nth data word is stored;

initializing an electronic device to be tested to produce said predetermined condition;

testing said electronic device to produce a second sequence of data words;

comparing for coincidence each successive Nth data word of said second sequence of data words with each successive data word of said stored Nth data words.

7. A method for testing electronic devices comprising the steps of:

initializing a known good electronic device of the type to be tested to a known, predetermined condition;

circulating for P circulations an initially determined data word through said known good electronic device and through a transfer function which, when in any given condition, will always alter any given data word in the same way;

sampling said circulating data word every Nth circulation thereof;

storing said sampled data words;

initializing an electronic device to be tested to said known, predetermined condition;

circulating for P circulations said initially determined data word through said electronic device being tested and through said transfer function;

sampling said circulating data word circulating through said electronic device being tested every Nth circulation thereof;

comparing for coincidence each successive sampled data word with the corresponding successive stored sampled data word.

8. A testing system for digitally testing electronic devices having an initialization mode of operation, a characterization mode of operation, and a testing mode of operation, and comprising;

first means for supplying a sequence of initializing instruction data words, and a sequence of initializing data words, and for receiving, storing, and supplying a sequence of sampled data words;

test station means for electrically connecting one of said electronic devices into said testing system;

transfer function means;

compare function means;

master control logic means, responsive to said initialization instruction data words, for supplying said initialization data words to said electronic device for initializing said electronic device to a given condition and for identifying the end of the initialization mode of operation;

said master control logic means further constructed to respond to the end of said initialization mode of operation to form a closed loop circuit comprising said electronic device and said transfer function means, to cause an initially determined data word to circulate in said closed loop circuit, and to sample said circulating data word every Nth circulation thereof;

said master control logic further comprising switching means having first and second states and constructed, when in a first state, to supply said sampled data words to said first means to be stored therein, and when in a second state to supply said sampled data words to said compare function means;

said first means further constructed to respond to the second state of said switching means of said master control logic to supply sequentially, and in the same order in which they were stored, the data words stored therein to said compare function means, with each Nth stored sampled data word being present in said compare function means during a time interval coincident with the presence in said compare function means of the Nth sampled data word of the circulating data word, where M represents any given time-corresponding sampling;

said compare function means constructed to compare the stored sampled data words and the sampled circulating data words supplied thereto for coincidence therebetween.

9. A testing system in accordance with claim 8 comprising in addition;

first storage means connected, during the initialization mode of operation, between the output of said data processor means and said electronic device;

and gating means responsive to the supplying of data words from said data processor means to become conductive to pass said data words into said first storage means;

and means for clocking said data words stored from said first storage means into said electronic device.

10. A testing system in accordance with claim 8 comprising;

first storage means connected, during said characterization mode of operation and during said testing mode of operation, between the output of said transfer function means and the input of said electronic device;

second storage means connected, during said characterization mode of operation and during said testing mode of operation, between the output of said electronic device and the input of said transfer function means;

said master control logic means comprising timing means;

gating means responsive to said timing means for progressively circulating a data word around the said closed loop circuit which comprises said second storage means, said transfer function means, said first storage means, and said electronic device.

11. A testing system in accordance with claim 8 in which;

said master control logic means and said first means are each constructed to respond to a comparison in said compare function means, of a sampled data word from said circulating sequence of data words and a stored sampled data word from said data processor before supplying another sampled data word to said compare function means.

12. The apparatus of claim 8 wherein the transfer function means includes means for randomizing the data word as it passes therethrough.

13. A testing system in accordance with claim 8 in which said master control logic means further comprises;
   first storage means responsive to said instruction data words to store the number of initialization data words to be supplied from said data processor means during said initialization mode of operation and to decrement said stored number by a predetermined number each time an initialization data word is supplied from said data processor means;
   counter means responsive to said instruction data words to become conditioned to count the number of data word circulations around said closed loop circuit between samplings and to indicate when such samplings are to be made;
   and second storage means responsive to said instruction data words to store the number of samplings to be made during each of the characterization mode of operation and the testing mode of operation, and to decrement said stored number each sampling of the data word during the characterization or testing modes of operation.

14. A testing system in accordance with claim 13 comprising in addition;
   third storage means connected, during said characterization mode of operation and during said testing mode of operation, between the output of said transfer function means and the input of said electronic device;
   fourth storage means connected, during said characterization mode of operation and during said testing mode of operation, between the output of said electronic device and the input of said transfer function means;
   said master control logic means comprising timing means
   gating means responsive to said timing means for progressively circulating a data word around the said closed loop circuit which comprises said fourth storage means, said transfer function means, said third storage means, and said electronic device.

15. A testing system in accordance with claim 14 in which;
   said third storage means comprises a plurality of fifth storage means, with each of said fifth storage means connected between the output of said transfer function and a different group of input terminals of said electronic device;
   said fourth storage means comprises a plurality of sixth storage means with each of said sixth storage means being connected between a different group of output terminals of said electronic device and the input of said transfer function means;
   said gating means comprises a plurality of gating means constructed to form a plurality of closed loop circuits with each closed loop circuit comprising said transfer function means, said electronic device and one each of said fifth and sixth plurality of storage means;
   and in which said master control logic means comprises selecting means for successively selecting each of said closed loop circuits for circulating the data completely around each selected closed loop circuit before selecting and circulating the data around the next selected closed loop circuit.

16. A testing system in accordance with claim 15 comprising, in addition;
   timing means constructed for circulating said data word around said closed loop circuit at selectable rates of speed.

17. A testing system in accordance with claim 14 in which;
   said third storage means comprises a plurality of fifth storage means, with each of said fifth storage means connected between the output of said transfer function and a different group of input terminals of said electronic device;
   said fourth storage means comprises a plurality of sixth storage means with each of said sixth storage means being connected between a different group of output terminals of said electronic device and the input of said transfer function means;
   said gating means comprises a plurality of gating means constructed to form a plurality of closed loop circuits with each closed loop circuit comprising said transfer function means, said electronic device and one each of said fifth and sixth plurality of storage means;
   and in which said master control logic means comprises selecting means for successively selecting each of said closed loop circuits and for circulating the data completely around each selected closed loop circuit before selecting and circulating the data around the next selected closed loop circuit.

18. A testing system in accordance with claim 13 comprising, in addition;
   timing means constructed for circulating said data words around said closed loop circuit at selectable rates of speed.

19. A testing system for digitally testing electronic devices having initialization, characterization, and testing modes of operation and comprising;
   data means for supplying a first sequence of instruction words to condition said testing system for a given initialization mode of operation and a given characterization or testing mode of operation and for supplying data words to initialize one of said electronic devices to a known condition;
   transfer function means;
   control means for circulating an initially determined data word around a closed loop circuit comprising said transfer function means and said electronic device;
   means for sampling said circulating data word every Nth circulation thereof around said closed loop circuit;
   compare function means;
   means for selectively supplying said sampled data words to one of said compare function means and said data processor means;
   said data processor means constructed to store said received sampled data words;
   means for consecutively supplying said stored sampled data words to said compare function means in the same order in which they were received and stored and at times coincident with the supplying of corresponding currently sampled circulating data words to said compare function means;
   said compare function means constructed to compare the stored sampled data words and the sampled circulating data words supplied thereto for coincidence;
   means responsive to non-coincidence between a stored data word and a currently sampled circulating data word in said compare function means to supply an error signal to said data processor means.

20. A testing system in accordance with claim 19 in which;
   said control means and said data means are each constructed to respond to a comparison, in said compare function means, of a sampled data word from said circulating sequence of data words and a stored sampled data word, before supplying another sampled data word to said compare function means.

21. The apparatus of claim 19 wherein the transfer function means includes means for randomizing the data word as it passes therethrough.

22. A testing system in accordance with claim 19 comprising:
   first storage means connected, during the initialization mode of operation, between the output of said data means and said electronic device;
   and gating means responsive to the supplying of data words from said data means to become conductive to pass said data words into said first storage means;

and means for clocking said data words stored from said first storage means into said electronic device.

23. A testing system in accordance with claim 19 comprising;

first storage means responsive to said instruction words to store a first given number of initialization data words to be supplied from said data means during said initialization mode of operation and to terminate the supplying of initialization data words when the given number of initialization data words have been supplied from said data means;

counter means responsive to said instruction words to become conditioned to count the number of data word circulations around said closed loop circuit between samplings and to indicate when such samplings are to be made;

and second storage means responsive to said instruction data words to store a second given number of samplings to be made during each of the characterization mode of operation and the testing mode of operation, and to terminate the present characterization or testing mode of operation when said second given number of samplings has occurred.

24. A testing system in accordance with claim 23 comprising;

third storage means connected, during said characterization mode of operation and during said testing mode of operation, between the output of said transfer function means and the input of said electronic device;

fourth storage means connected, during said characterization mode of operation and during said testing mode of operation, between the output of said electronic device and the input of said transfer function means;

timing means;

gating means responsive to said timing means for progressively circulating a data word around the said closed loop circuit which comprises said fourth storage means, said transfer function means, said third storage means, and said electronic device.

25. A testing system in accordance with claim 24 in which;

said third storage means comprises a plurality of fifth storage means, with each of said fifth storage means connected between the output of said transfer function means and a different group of input terminals of said electronic device;

said fourth storage means comprises a plurality of sixth storage means with each of said sixth storage means being connected between a different group of output terminals of said electronic device and the input of said transfer function means;

said gating means comprises a plurality of gates constructed to respond to said timing means to form a plurality of closed loop circuits, with each closed loop circuit comprising said transfer function means, said electronic device and one each of said fifth and sixth plurality of storage means;

and comprising selecting means for successively selecting each of said closed loop circuits and for circulating the data completely around each selected closed loop circuit before selecting and circulating the data around the next selected closed loop circuit.

26. A testing system in accordance with claim 19 comprising;

first storage means connected, during said characterization mode of operation and during said testing mode of operation, between the output of said transfer function means and the input of said electronic device;

second storage means connected, during said characterization mode of operation and during said testing mode of operation, between the output of said electronic device and the input of said transfer function means;

timing means;

gating means responsive to said timing means for progressively circulating a data word around the said closed loop circuit which comprises said second storage means, said transfer function means, said first storage means, and said electronic device.

27. A testing system in accordance with claim 26 in which;

said timing means is constructed to circulate said data word around said closed loop circuit at selectable rates of speed.

28. A testing system in accordance with claim 26 in which;

said first storage means comprises a plurality of third storage means, with each of said third storage means connected between the output of said transfer function and a different group of input terminals of said electronic device;

said second storage means comprises a plurality of fourth storage means with each of said fourth storage means being connected between a different group of output terminals of said electronic device and the input of said transfer function means;

said gating means comprises a plurality of gates constructed to respond to said timing means to form a plurality of closed loop circuits, with each closed loop circuit comprising said transfer function means, said electronic device and one each of said third and fourth plurality of storage means;

and comprising selecting means for successively selecting each of said closed loop circuits and for circulating the data completely around each selected closed loop circuit before selecting and circulating the data around the next selected closed loop circuit.

29. A testing system in accordance with claim 28 in which;

said timing means is constructed to circulate said data word around said closed loop circuit at selectable rates of speed.

30. Apparatus for digitally testing electronic units comprising, in combination:

unit input and unit output means for connection to a unit to be tested;

first means for supplying initializing data words;

switching means connected to said unit input means, said unit output means and said first means for first supplying said initializing data words to a unit to be tested via said unit input means and for subsequently circulating data words from said unit output means to said unit input means;

second means for sampling said circulating data words at predetermined intervals;

storage means, connected to said second means, for storing the sampled data words obtained from testing a reference known good unit;

comparison means, connected to said storage means, and said second means, for comparing the stored sample data words from the reference known good unit with time corresponding sample data words from the unit being tested; and apparatus output means for providing an indication of the comparison.

31. Apparatus for testing electronic devices comprising in combination:

first means for supplying a given sequence of initializing instruction data words and a sequence of initializing data words, and for receiving, storing, and supplying a sequence of sampled data words;

second means for comparing two inputs;

third means connected to said first means for initially causing said first means to supply said sequence of initializing instruction data words to a unit to be tested and then causing said first means to circulate the resulting data words in a closed loop circuit, said third means sampling the circulating data word at predetermined circulation intervals thereof, said third means being further connected to said second means for supplying sampled data words thereto indicative of signals obtained from a known good unit and supplying the sampled data words from the unit under test to said second means in the same order as originally obtained for comparison within said second means; and output means for providing an indication of the comparison function.

* * * * *